United States Patent [19]

Abe et al.

[11] 4,438,796

[45] Mar. 27, 1984

[54] PNEUMATIC TIRE FOR OFF-ROAD VEHICLES

[75] Inventors: Masaru Abe, Sayama; Isao Miyoshi, Kodaira; Toshiro Tezuka, Higashi-Murayama; Toshio Yoshimoto, Akigawa, all of Japan

[73] Assignee: Bridgestone Tire Company Limited, Tokyo, Japan

[21] Appl. No.: 62,868

[22] Filed: Aug. 1, 1979

Related U.S. Application Data

[63] Continuation of Ser. No. 781,029, Mar. 24, 1977, abandoned.

[30] Foreign Application Priority Data

Mar. 26, 1976 [JP] Japan ................................ 51-33266

[51] Int. Cl.³ ........................ B60C 9/04; B60C 9/20
[52] U.S. Cl. ......................... 152/353 R; 152/354 R; 152/355; 152/356 R; 152/359; 152/360; 152/361 R
[58] Field of Search ............ 152/354 R, 354 RB, 355, 152/356 R, 356 A, 357 R, 357 A, 358, 359, 361 R, 361 FP, 361 DM, 352 R, 353 R

[56] References Cited

U.S. PATENT DOCUMENTS

| | | | |
|---|---|---|---|
| 1,818,944 | 8/1931 | Darron | 152/354 |
| 3,090,189 | 5/1963 | Boussu et al. | 57/311 X |
| 3,392,774 | 7/1968 | Le Bosse | 152/361 R |
| 3,449,199 | 6/1969 | Mead | 152/357 R |
| 3,509,930 | 5/1970 | Mirtain | 152/354 R |
| 3,682,222 | 8/1972 | Alderfer | 152/361 R |
| 3,700,012 | 10/1972 | Alderfer | 156/436 |
| 3,703,203 | 11/1972 | Simpson | 152/354 |
| 3,980,119 | 9/1976 | Nakasaki | 152/354 |
| 3,982,580 | 9/1976 | Inoue et al. | 152/361 R |
| 4,077,454 | 3/1978 | Miyoshi et al. | 152/354 R |

FOREIGN PATENT DOCUMENTS

| | | | |
|---|---|---|---|
| 2096405 | 2/1972 | France | 152/359 |
| 1094654 | 12/1967 | United Kingdom | 152/354 |

*Primary Examiner*—Lois E. Boland
*Attorney, Agent, or Firm*—Sughrue, Mion, Zinn, Macpeak and Seas

[57] ABSTRACT

A pneumatic tire for off-road vehicles comprising a reinforcing element composed of helically formed filaments and having an excellent side-cut resistant property is disclosed. The tire is provided at its side portion with a side portion reinforcing layer composed of at least one rubberized layer containing a reinforcing element embedded therein and formed of a helically formed filament or a bundle of at least two helically formed filaments assembled together without twisting at random. The filament is formed of a material having a tensile breaking strength of at least 140 kg/mm². The reinforcing filament has an elongation at tensile breaking strength which is 0.15 to 1.7 times that of organic cord of a ply of a carcass body. The rubberized layer containing said reinforcing element embedded therein as a whole is extensible.

14 Claims, 25 Drawing Figures

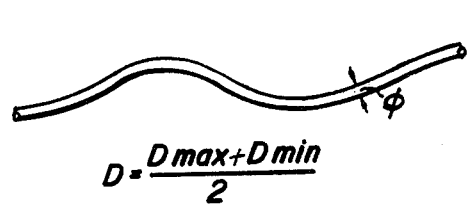
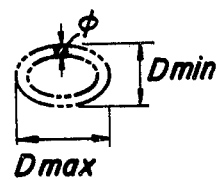
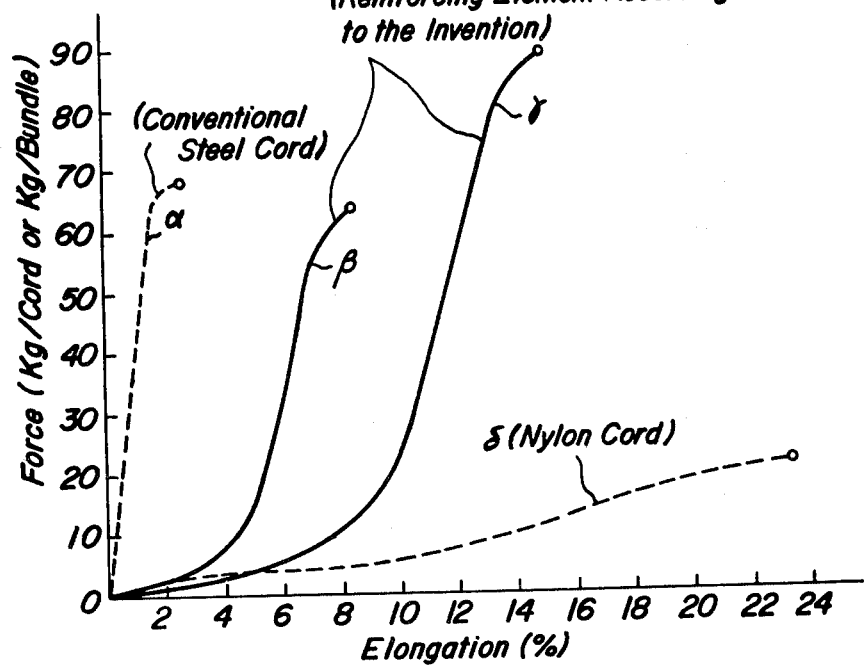

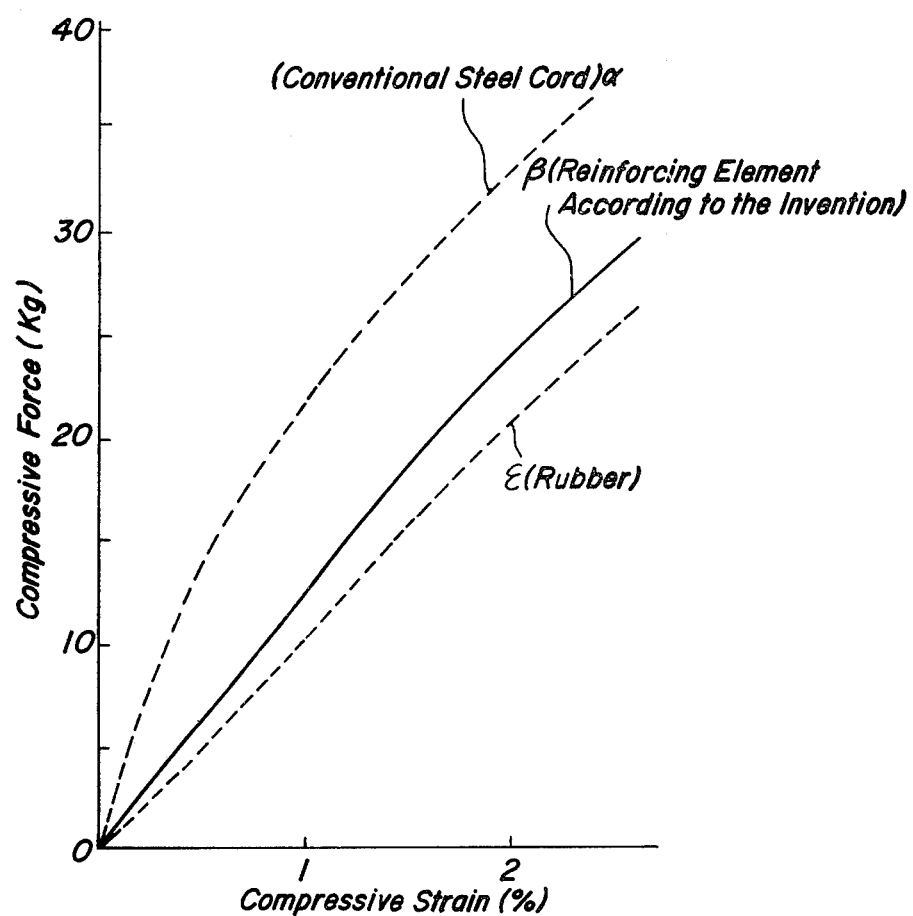

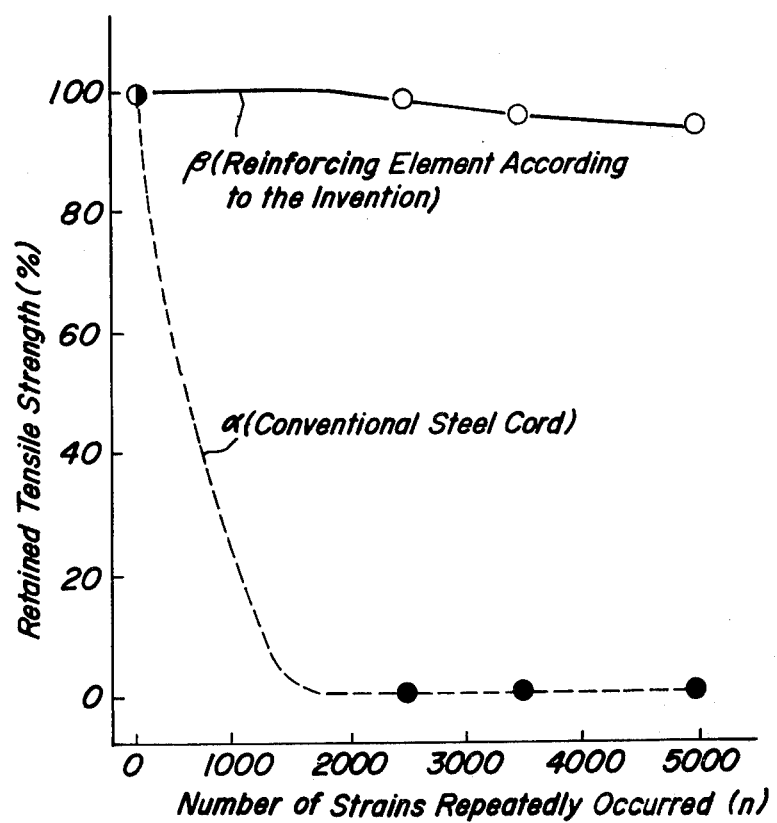

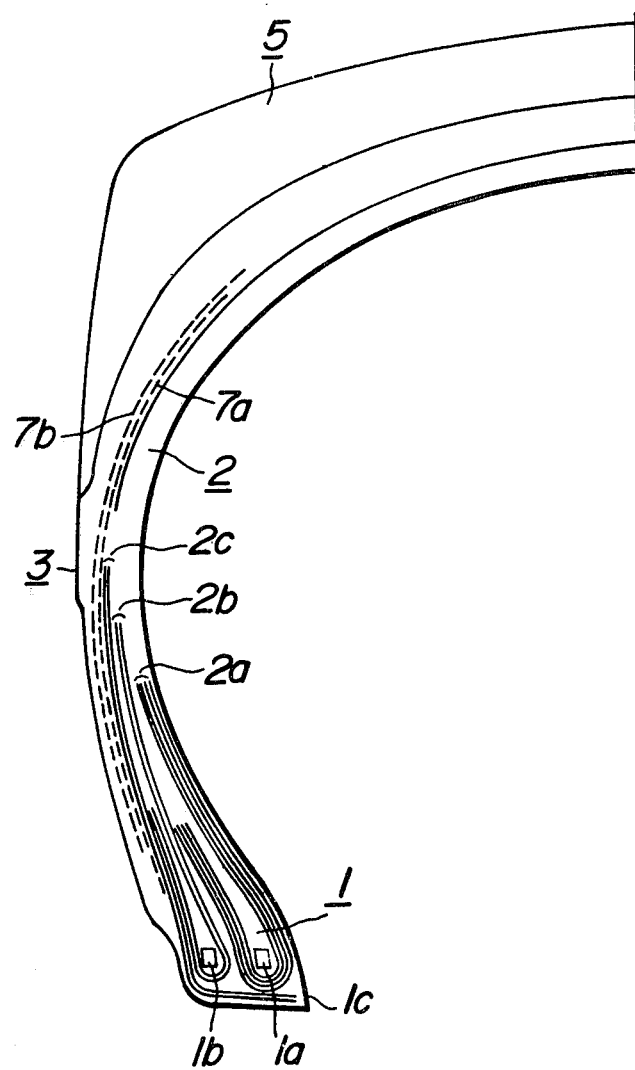
FIG_5

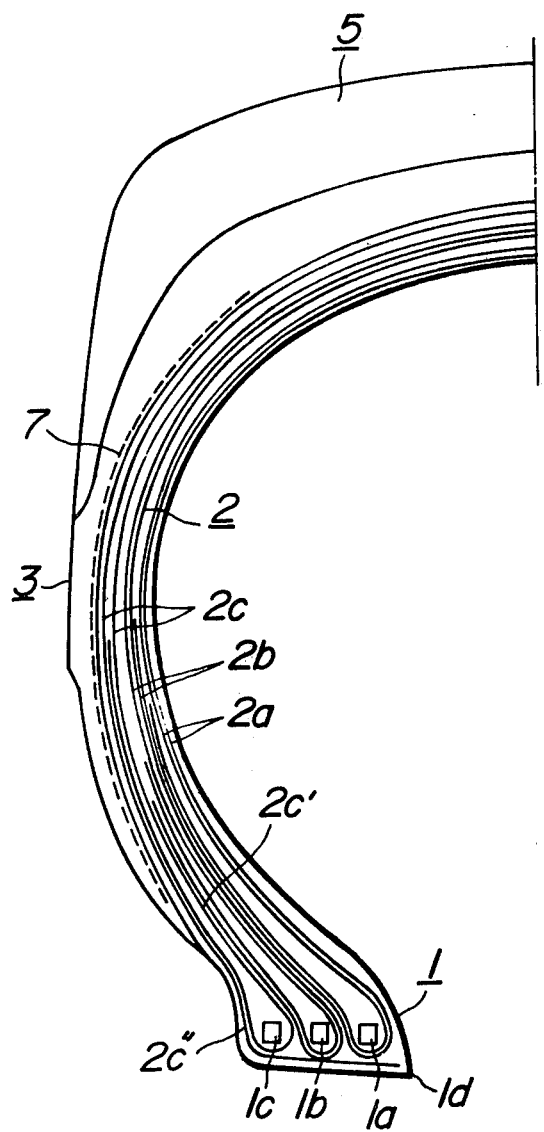

FIG_8

FIG_15

FIG_17

PNEUMATIC TIRE FOR OFF-ROAD VEHICLES

This is a continuation of application Ser. No. 781,029, filed Mar. 24, 1977, now abandoned.

This invention relates to pneumatic tires and more particularly to a pneumatic tire for off-road vehicles comprising a reinforcing element composed of helically formed filaments and having an excellent side-cut resistant property.

Such kind of tire is represented by a tire for construction vehicles such as a dump truck, scraper, shovel loader and the like, cultivation vehicles such as a logs-kidder, logforward and the like, and industrial vehicles such as a forklift, yard truck, trailer and the like. The invention specifically relates to improvement in side-cut resistant property of these tires.

The pneumatic tire for off-road vehicles run on road where obstructions such as rocks, broken metal pieces, broken glass pieces or stubs are scattered thereon. In addition, the load subjected to one tire is generally large. As a result, such kind of pneumatic tires are required to have a high resistance against damage due to cuts for the purpose of using these tires for a long time.

The most important properties required for such special kind of pneumatic tires are the cut resistant property, resistance against separations in and between layers on a crown portion and any other portions of the tire and abrasion resistant property. Particularly, it has been deemed necessary to increase the cut resistant property.

Cuts subjected to the pneumatic tire for off-road vehicles are divided broadly into two kinds. That is, cuts subjected to a crown portion extending across both shoulder portions of a tread, i.e. a crown-cut and cuts subjected to a side portion extending from a shoulder portion through a maximum width position of the tire to bead portions, i.e. a side-cut.

Under the general service condition of the pneumatic tire for off-road vehicles, the frequency of occurrences of the crown-cut is far larger than that of the side-cut. In the pneumatic tire for off-road vehicles, therefore, it is sufficient to improve chiefly the cut resistant property of the crown portion and to improve additionally the cut resistant property of the side portion.

In practice, however, the tire is used under such conditions that the frequency of occurrences of the side-cut could not be disregarded and that the frequency of occurrences of the side-cut becomes larger than that of the crown-cut. That is, a driver could not pass between obstacles scattered on road without riding thereon under such circumstances that there are a large number of obstacles or these obstacles are large in size even when there are a relatively small number of obstacles, that the driver lacks experience or is idle, and that even though the driver is skillful, the site is narrow in space.

Damage due to cut produced in the side portion tends to become large if compared with damage due to cut produced in the crown portion owing to the property of the strain or stress produced in the tire when it runs under load and to the property of the relative movement between the obstacles and the tire. In addition, the strain produced in the tire when it travels under load tends to be grown and the side portion which is thin in thickness is liable to be easily subjected to damage due to cut pierced therethrough. By the same reasons, the repair of tire becomes difficult. As a result, the side-cut directly results in a useless waste tire. Since the above described service condition exists in practice, the side-cut must not be overlooked.

An object of the invention, therefore, is to provide a pneumatic tire for off-road vehicles which has an improved side-cut resistant property.

Many attempts have been made to improve the side-cut resistant property of a pneumatic tire for off-road vehicles, but hitherto none has led to fully satisfactory results. That is, it is not always possible to completely improve the side-cut resistant property. The conventional measures are uselessly expensive and cause the side portion or any other portions to considerably degrade its or their separation resistant property. In addition, the damage subjected to the bead portion is increased to such extent that could not be overlooked. Thus, the use of measures described is difficult to apply to the tire as its all-round means of preventing all types of cut failures.

This point will now be described in greater detail. In a conventional first type tire, its side portion is provided at its region extended from the shoulder portion through the maximum width position of the tire to the upper part of the bead with an annular projection rubber which functions to prevent the cut and growth and development thereof. Even though the thickness of the rubber layer can be made thick by the presence of such projection, the property of the strain subjected to the tire when it travels under load causes to produce tensile strain at a position directly beneath the load and subjected to the cut and in a direction perpendicular to the direction of obstacle penetrating into the side portion. As a result, a rate of increase of the frictional force is small and hence the effect of increasing the side-cut resistant property is limited. In addition, the presence of the projection tends to increase chance of receiving the side-cut by several times larger than the case of absence of the projection. So, the effect of increasing the side-cut resistant property is kept smaller than the apparent effect thereof. In addition, if the tire rides on one side of a rock which is considerably larger than the projection, the sharp end of the rock is raised up and intensely urged against the tire, so that the cut preventive effect can not be attained. In addition, since the projection is arranged at that part of the side portion which is near the crown portion, i.e. near the shoulder portion, heat radiation effect becomes remarkably impeded. As a result, temperature rise in that crown portion which is located near the shoulder portion and where the maximum strain is produced becomes significantly increased, so that the separation resistant property of the crown portion is considerably decreased.

If the projection is arranged near the maximum width position of the tire, the bending rigidity of the side portion is remarkably increased to decrease the flexibility thereof. As a result, the axial compressive force subjected to the side portion is increased and the strain due to such compressive force is concentrated into the bead portion whose rigidity is relatively small, so that the durability of the bead portion is significantly decreased. In any case, the overall durability of the tire is not so much improved irrespective of an increase of cost required for such improvement, so that the above described proposal is not suitable in practice.

In a conventional second type tire, the thickness of the sidewall near the center of the maximum width position of the tire is made thick for the purpose of preventing occurrence of cuts and growth and development thereof by the presence of the thick rubber layer portion. However, the effect of improving the side-cut resistant property of the tire is limited in the same reasons as described above with reference to the first type tire. In addition, if the thickness of rubber at the maximum width position of the tire is made thick, the thickness of rubber near the shoulder portion is always increased in view of balance in shape with the carcass, thereby remarkably impeding the heat radiation effect. As a result, the separation resistant property of the crown portion becomes significantly decreased in the same manner as in the case of the first type tire. In addition, if the thickness of rubber of the side portion is increased, the bending rigidity of the side portion becomes significantly increased. As a result, the durability of the bead portion becomes extremely reduced. At any rate, the measure proposed with respect to the second type tire is not also suitable in practice in the same manner as the first type tire.

In a conventional third type tire, a rubberized layer containing thin metal filaments each having a length of about 10 mm embedded therein is interposed between the sidewall rubber layer and the carcass layer for the purpose of preventing growth of the side cut starting from the sidewall. This conventional third type tire will hereinafter be called as wire under tread tire, i.e. W.U.T. tire. In such W.U.T. tire, if much amount of the metallic filaments which is sufficient to exhibit the side-cut resistant property of the tire, separation is frequently occurred in the W.U.T. layer or between the W.U.T. layer and the outer rubber layer of the side portion or between the W.U.T. layer and the carcass layer. As a result, the tire is subjected to a premature separation failure before the side-cut resistant property of the tire becomes effective and hence becomes a useless waste tire. On the other hand, if the amount of the metal filaments is decreased to such an extent that the premature separation failure is not occurred, the desired improvement relating to the side-cut resistant property could not be attained. As a result, the effect of improving the overall durability of the tire by the use of the W.U.T. layer is very small. Thus, there is no positive reasons why the W.U.T. layer should be used at the sacrifice of lowering the yield and increasing material cost.

Finally, in a conventional fourth type tire, provision is made of a sidewall reinforcing layer containing steel cords embedded therein. As well known in the art, the steel cord for tires is composed of a plurality of stranded cords each formed of a plurality of elongate steel filaments each having a diameter of the order of 0.15 mm to 0.3 mm and twisted together into a cord. These steel cords are arranged side by side and equally spaced apart from each other and embedded in a rubberized layer. The rubberized layer is interposed between the carcass layer and the outer rubber layer of the side portion for the purpose of preventing cuts produced at the side portion from being pierced and grown therethrough. The conventional fourth type tire constructed as above described is a representative example of a tire having a sidewall reinforcing layer reinforced with the steel cords.

It has been well known by those skilled in the tire art that the rubberized layer containing steel cords embedded therein functions to improve the cut resistant property of the tire to a certain extent as in the case, for example, of the steel breaker of a tire for common passenger cars which can prevent the tire from being punctured when it rides on nails. Such rubberized layer containing steel cords embedded therein and used as the sidewall reinforcing layer of the pneumatic tire for off-road vehicles exhibits the highest effect among the conventional tires with respect to the side-cut resistant property against general cuts produced when a sharp obstacle is pierced from the sidewall surface into the carcass, in other words, when a sharp hard tip corresponding to the blade end of a cutter is penetrated from the sidewall surface into the carcass and in the cuts the maximum strain position is moved in succession into the carcass in dependence with cracks of rubber. On the contrary, if the maximum strain or stress position produced when the tire rides on an obstacle having a relatively large angle or round angle and the side portion is urged against it and cuts present in the rubber layer of the side portion or in the side portion reinforcing layer and a first breakage is produced therein, the tensile modulus of elasticity of the steel cord is far larger than that of the adjacent rubber layer or the organic fiber cord constituting the carcass ply, so that stress concentration tends to occur in the steel cord. In addition, the elongation at tensile breaking strength of the steel cord is approximately 0.08 to 0.11 times that of the organic fiber cord constituting the carcass ply, so that the steel cord becomes easily broken. As a result, the steel cord has no effect against such kind of cuts. Moreover, that portion of the steel cord which is prematurely broken induces a premature separation of the tire, thereby degrading the overall durability of the tire. In addition, not only the tensire modulus of elasticity but also compressive modulus of elasticity and bending rigidity of the steel cord are far larger than those of adjacent rubber layer and organic fiber cord constituting the carcass ply. As a result, when the tire is inflated or travels under load, the relative displacement or relative strain between the steel cord and adjacent rubber layer and carcass cord becomes large particularly at the end of the steel cord. In addition, when the tire travels under load, the crown portion is exposed to a high temperature. Thus, the separation resistant property of the tire is significantly reduced. Moreover, the steel cord having a conspicuously large compressive modulus of elasticity can not absorb the axial compressive force produced when the tire travels under load and hence is subjected to buckling, repetition of which results in breakage of the steel cord, thereby inducing the premature separation of the tire. In addition, the steel cord having considerably large modulus of elasticity and bending rigidity results in an extremely large side portion bending ridigity, thereby considerably degrading the bead portion durability in the same manner as in the case of the first and second type tires.

In addition, the amount of flexure of the tire having the radial construction carcass is far larger than that of the tire having the bias construction carcass, so that the steel cord end is subjected to a larger strain or stress. The steel cord having substantially no elongation is liable to be easily separated. The fourth type tire having the above described drawbacks lacks overall durability and hence could not confidently recommend it in practice.

An object of the invention, therefore, is to provide a pneumatic tire for off-road vehicles which can improve the side-cut resistant property, which is the most important characteristic required, and further improve both the separation resistant property and the bead failure resistant property.

Another object of the invention is to provide a pneumatic tire for off-road vehicles having overall side-cut resistant property which can prevent various types of sidecuts.

A further object of the invention is to provide a pneumatic tire for off-road vehicles which can manufacture in a less expensive manner.

A feature of the invention is the provision of a pneumatic tire for off-road vehicles comprising a reinforcing element composed of helically formed filaments and having an excellent side-cut resistant property, comprising a toroidal-shaped carcass body composed of a plurality of rubberized ply layers superimposed one upon the other and each containing organic fiber cords embedded therein; a side portion formed of a rubber coating made integral with both said carcass body and a tread portion; and a side portion reinforcing layer arranged in said side portion and for preventing cuts subjected to the surface of said side portion, said side portion reinforcing layer being composed of at least one rubberized layer containing a reinforcing element embedded therein and formed of a helically formed filament or a bundle of at least two helically formed filaments assembled together without twisting at random and each made of material having a tensile breaking strength of at least 140 kg/mm², said reinforcing element having an elongation at tensile breaking strength which is 0.15 to 1.7 times that of organic cord of the ply of the carcass body, and said rubberized layer as a whole being extensible.

The pneumatic tire for off-road vehicles constructed as above described according to the present invention may preferably be embodied by the following limitations.

(1) The helically formed filament of the reinforcing element has a diameter $\phi$ of 0.1 mm to 1.0 mm and average diameter D of an outer contour projected on a plane perpendicular to the axial direction of one pitch of the filament, i.e. (Dmax+Dmin)/2 of 2 $\phi$ to 20 $\phi$.

(2) The helically formed filament of the reinforcing element is formed of a steel wire.

(3) A ratio $\delta$ of a pitch between the two adjacent reinforcing elements to a pitch between the midlines of the reinforcing elements is given by $$\delta = \frac{\{S - (D + d - \phi)\}}{S} = 0.11 \text{ to } 0.78$$

where S is a pitch in mm between midlines of the two adjacent reinforcing elements, d is an effective diameter in mm of the reinforcing element derived by calculation from $$1.25 \times \sqrt{N} \times \phi \text{ (mm)}$$

where N is the number of filaments for constituting the reinforcing element.

(4) The rubber containing the reinforcing element embedded therein has a Shore A hardness of 50° to 85°, 300% modulus of elasticity of 80 kg/cm² to 230 kg/cm² and tensile breaking strength of 150 kg/cm² to 250 kg/cm².

(5) About one-half of a plurality of ply cords for constituting the carcass body are arranged in a direction which is opposite to a direction of the remainder of ply cords so as to constitute a bias construction.

(6) The ply cords of the carcass body are arranged in or substantially in parallel with a plane inclusive of the vertical center section through the rotational axis of the tire so as to constitute a radial construction.

(7) The side portion reinforcing layer is arranged independently in each side portion of the tire.

(8) The side portion reinforcing layer is extended continuously from one of the side portions through a crown portion to the other side portion.

(9) The side portion reinforcing layer is arranged along the outside of the carcass body.

(10) The side portion reinforcing layer is arranged near the coating rubber of the side portion and interposed between the plies of the carcass body.

(11) The side portion reinforcing layers are superimposed one upon the other and arranged along the outer surface of the carcass body, each of said side portion reinforcing layers being divided into a plurality of sections in its widthwise direction, the sections being spaced apart from each other.

(12) An additional layer composed of at least one organic fiber cord layer is arranged outside the side portion reinforcing layer.

In short, in all of the above described embodiments of the invention, at least one side portion reinforcing layer composed of helically formed filaments is used as the side-cut preventive layer and superimposed about the carcass body, the side portion reinforcing layer being arranged in a side portion which is extended from near the shoulder portion through the maximum width position of the tire to near the bead portion.

Experimental tests and exhaustive researches have demonstrated that the reinforcing element for constituting the side portion reinforcing layer which function as the side-cut preventive layer for the pneumatic tire for off-road vehicles is required to have the following properties.

(1) Tensile breaking strength which is necessary and sufficient for exhibiting the cut preventive effect.

(2) Elongation at tensile breaking strength which is necessary and sufficient for exhibiting the preventive effect against all types of side-cuts.

(3) Tensile modulus of elasticity within a range which does not accelerate the separation failure and does not produce the cord breakage.

As described above, both the third type W.U.T. layer and the fourth type rubberized layer containing steel cords embedded therein are unsuitable as the side-cut preventive layer. As a result, provision must be made of a new type reinforcing element. This is the reasons why the present invention is started.

In order to provide such new type reinforcing element, the invention makes use of the analytical result of the cut generation mechanism on the conventional tire particularly provided with the side portion reinforcing layer reinforced with the steel cord.

After exhaustive researches, the inventors have been very much interested by a helically formed filament described in U.S. Pat. No. 3,682,222.

As described in greater detail in the above mentioned U.S. Patent specification, such helically formed filament has been developed as a belt material for a radial tire or belted bias tire. If the helically formed filament functions as a tension supporting member in circumferential direction of a pneumatic tire, the helically formed filament is substantially inextensible. As a result, the radial or belted bias tire provided with such helically formed filament is substantially the same in function as the above described conventional fourth type tire. Thus, even if the helically formed filament per se is converted into the side-cut preventive layer, no particular effect could be obtained.

The invention is based on such inventors' recognition that, contrary to the use of the helically formed filament as the inextensible belt member as disclosed in the above mentioned U.S. Pat. No. 3,682,222, the use of the reinforcing element composed of helically formed filaments or a bundle of at least two helically formed filaments assembled together without twisting at random as substantially extensible side portion reinforcing layer provides the important advantage that such side portion reinforcing layer can be used as the side-cut preventive layer of a pneumatic tire for off-road vehicles and that the side-cut resistant property of the tire can significantly be improved.

The helically formed filament may be formed of steel and other metals having a high cut resistant property or glass or organic materials. The material such as nylon, rayon and the like used usually as the tire cord and having a tensile breaking strength on the order of 80 kg/mm$^2$ to 110 kg/mm$^2$ is substantially unsuitable as the cut resistant material. It has been found out that the cut resistant material which can attain the object of the invention must be of one having a tensile breaking strength of at least 140 kg/mm$^2$, preferably 170 kg/mm$^2$, and 200 kg/mm$^2$ or more when a maximum cut resistant property is required.

This value of tensile breaking strength is a minimum value which is required to check the penetration of the cuts started from the sidewall surface by the side portion reinforcing layer and which is allowable from the economical standpoint of view.

If the tensile breaking strength of the cut resistant material is smaller than 140 kg/mm$^2$, that cross sectional area thereof which is required to obtain the necessary and sufficient cut resistant property becomes excessively large. If the cut resistant material having such excessively large cross sectional area must contain therein the reinforcing elements each having a diameter which is limited in cross sectional area and layers limited in number, the number of these elements must be increased to a practically unrealizable extent.

On the other hand, if the number of these elements is limited to a practically realizable extent, the cross sectional area of the diameter of the reinforcing element becomes enlarged to a practically unrealizable extent. Alternatively, if the sectional area of the diameter of the reinforcing element is limited, the number of layers thereof becomes increased, which is economically unrealizables.

The elongation at tensile breaking strength of the reinforcing element constituting the side portion reinforcing layer is required to be at most 1.7 times, preferably 1.4 times that of the organic fiber cord of the carcass body.

This is because of the fact that if the elongation at tensile breaking strength of the reinforcing element exceeds 1.7 times that of the organic fiber cord of the carcass body, the carcass cord arrives at its breaking point before the reinforcing element of the side portion reinforcing layer reaches to its breaking point, thereby moving the breaking point from the reinforcing element to the carcass cord.

On the other hand, the minimum elongation at tensile breaking strength of the reinforcing element used for the side portion reinforcing layer is required to be at least 0.15 times, preferably 0.25 times that of the organic fiber cord of the carcass body. This corresponds to an elongation at tensile breaking strength which is 2 to 3 times larger than that of the conventional steel cord and could not be obtained by a conventional steel cord formed by twisting together steel filaments.

The cuts locally occur at any place on the tire side portion and the frequency of occurrences of the cuts is different in dependence with that place on the tire side portion where the cuts occur. A region of the tire within which the stress and strain are subjected thereto due to the cuts are limited to a relatively local region, and as a result, the above mentioned elongation at tensile breaking strength of the reinforcing element constituting the side portion reinforcing layer must be satisfied at any local position of the tire. Thus, the above mentioned elongation at tensile breaking strength is defined such that it is obtained per a length of 25 mm of the reinforcing element.

The use of a reinforcing element composed of a bundle of helically formed filaments and having a particularly large elongation at tensile breaking strength contributes greatly to effectively reduce cuts occurred in the tire.

It is further important that the side portion reinforcing layer constructed as above described by using a reinforcing element composed of helically formed filaments must be extensible as a whole. This is the most desirable property required for the side-cut preventive layer for the purpose of effectively adopting it to the carcass body using the organic fiber cords. Such property could not be obtained by the reinforcing element composed of the conventional steel cords.

The shape and construction of the reinforcing element according to the invention will now be described.

As the reinforcing element, use may be made of one or plurality of bundles each composed of flexible and permanently helically formed filaments each formed of a material having a high tensile breaking strength as described above. At least 2, preferably 3 to 30 and at most 50 of relatively thin helically formed filaments each having a diameter of 0.1 mm to 1.0 mm, preferably 0.13 mm to 0.5 mm are merely assembled together without twisting at random and without binding them together by means of exterior binding wires into a bundle. In this case, adjacent two helically formed filaments are not aligned with each other.

The invention will now be described in greater detail with reference to the accompanying drawings, wherein:

FIG. 1a is a side elevation of a helically formed filament for constituting a reinforcing element according to the invention;

FIG. 1b is its end view showing an outer contour projected on a plane perpendicular to the axial direction of one pitch of the filament shown in FIG. 1b, a part being shown in section;

FIG. 2 is a graph illustrating tensile test results yielded from reinforcing elements according to the invention as compared with those yielded from a conventional steel cord and nylon cord;

FIG. 3 is a graph illustrating compression test results yielded from a reinforcing element embedded in rubber according to the invention as compared with those yielded from conventional steel cord embedded in rubber and rubber cord;

FIG. 4 is a graph illustrating compressive fatigue test results yielded from a reinforcing element according to the invention as compared with that yielded from a conventional steel cord;

FIGS. 5 and 6 are cross-sectional views showing one-half of bias construction tires according to the invention, parts being shown in vertical center section through the rotational axis of the tire;

Figure 7:
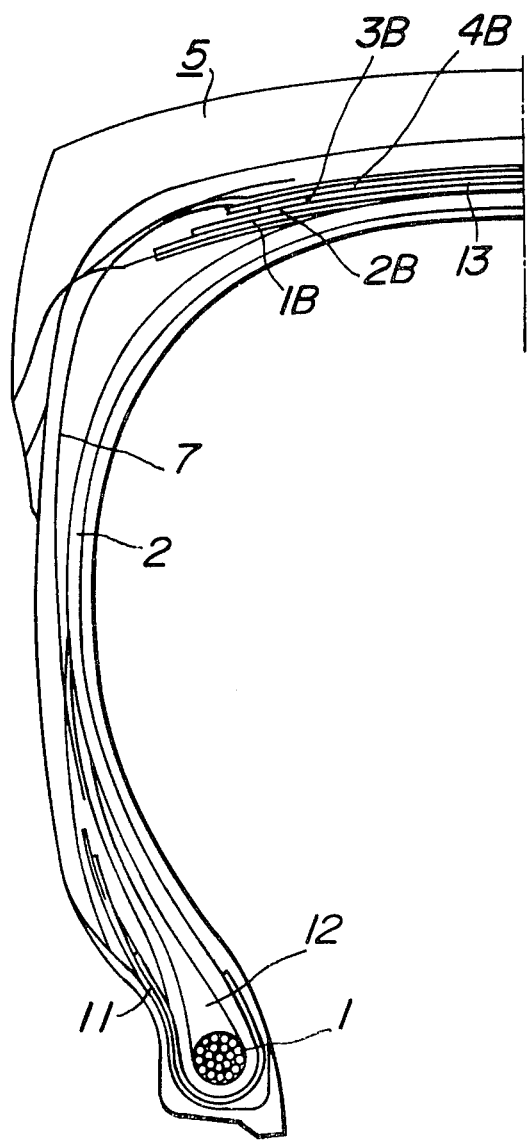
FIG. 7 is a cross-sectional view showing one-half of a radial construction the according to the invention, parts being shown in vertical center section through the rotational axis of the tire.

In FIGS. 1a and 1b is shown an individual shape of a helically formed filament. The ideal shape of the outer contour projected on a plane perpendicular to the axial direction of one pitch of the filament should be true circle for the purpose of equalizing the stress subjected to it. The formation of the filament having such true circle is not only very difficult in technique but also requires a number of steps in the case of incorporating such filament into the tire. As a result, it is further difficult to maintain the above described true circle of the filament in the finished tire.

Experimental tests and exhaustive researches on a practically allowable deviation from the true circle have demonstrated that if a ratio of a maximum diameter of the outer contour projected on a plane perpendicular to the axial direction of one pitch of the filament to a minimum diameter thereof lies within a range to be described later. the stress subjected to the filament becomes substantially uniformly destributed, and as a result, the premature fatigue breakage is not induced. That is, in FIGS. 1a and 1b, a ratio of the maximum diameter Dmax to the minimum diameter Dmin, that is, Dmax/Dmin is required to lie within a range of 1 to 1.5.

In addition, an average diameter D, that is, (Dmax+Dmin)/2, of the outer contour projected on a plane perpendicular to the axial direction of one pitch of the filament should be 2 $\phi$ to 20 $\phi$, preferably 3 $\phi$ to 15 $\phi$, $\phi$ being the diameter of the helically formed filament.

As a method of obtaining a desirous elongation of filaments, each formed of material having a high tensile breaking strength, for example, high carbon steel, and assembled together without twisting, it might be conceived to arrange undulate filaments in parallel with each other in one same plane. In this case, however, stress becomes concentrated into bent portions of the undulate filament in response to extension and compression in the lengthwise direction thereof. In addition, this stress is a bending stress to be concentrated into a part of the cross section of the filament, so that there frequently occurs the premature fatigue breakage at the bent portions of the filament. As a result, it has been found out that such undulate filament could not be used in practice in place of the above mentioned helically formed filament.

On the contrary, in accordance with the invention, a filament is formed of a helically formed filament so as to obtain a necessary elongation. In this case, the stress produced in response to the extension or compression in the lengthwise direction of the helically formed filament is substantially uniformly distributed over any portin of the filament in its lengthwise direction. In addition, the above mentioned stress is a torsional shearing stress which is liable to be easily distributed in a relatively uniform manner over the cross section of the filament, so that it is possible to completely prevent the fatigue breakage of the filament.

Inventors' study has shown that if helically formed filaments each formed of the same material are used as a reinforcing element of a side-cut protective layer, the cut resistant property of the tire depends upon the overall cross sectional area of those filaments which are included in the cut breaking surface, but does not depend upon each cross sectional area of respective filaments. As a result, it might be desirous to use a filament which is least possibly small in diameter. But, the use of a filament whose diameter $\phi$ is smaller than 0.1 mm results in occurrence of cuts of the filaments in non-allowable frequency in the step of shaping the helically formed filament. As a result, the use of such filament is not economical.

On the contrary, if use is made of a filament whose diameter $\phi$ is larger than 1.0 mm, internal stress produced in the filament during the step of shaping the helically formed filament becomes excessively large. In addition, torsional shearing stress which occurs when extension or compression is subjected to the filament in its lengthwise direction is concentrated to the outer contour of the filament. As a result, the overall cross sectional area required for maintaining the strength which is required to withstand the same exterior force becomes larger than that necessary for the thin filament, thereby requiring much amount of material. As a result, the use of the filament having a diameter larger than 1.0 mm is not economical.

As seen from the above, the diameter $\phi$ of the filament is required to lie within a range from 0.1 mm to 1.0 mm. The relation between the diameter $\phi$ of the filament and the average diameter D of the outer contour projected on a plane perpendicular to the axial direction of one pitch of the helically formed filament will now be described. If D is smaller than 2 $\phi$, the pitch of the helically formed filament is required to be excessively small for the purpose of obtaining the desired elongation. As a result, the cuts of the filaments occur in non-allowable frequency in the same manner as in the case of using the filament whose diameter is excessively small. At the same time, the internal stress produced when the filament is helically formed becomes excessively large.

On the one hand, respective helically formed filaments are generally assembled together without twisting at random into a cord-shaped reinforcing element which is arranged in the tire. Each of the helically formed filaments constituting each reinforcing element is arranged in the bundle in a zig-zag course. As a result, if the above mentioned average diameter D is larger than 20 $\phi$, the sectional area formed between the most protruded surfaces of two adjacent helically formed filaments arranged in the tire as its reinforcing element becomes too small to define that distance therebetween which is required for maintaining the desired separation resistant property, and as a result, sufficiently large cut resistant property could not be obtained. On the contrary, if it is desired to obtain the sufficiently high cut resistant property, the above mentioned distance required between the two adjacent elements could not be maintained, so that a sufficiently high separation resistant property could not be obtained. In addition, in order to obtain the sufficiently high separation resistant property, not only the above mentioned distance required between the two adjacent helically formed filaments, but also the distance between the sidewall rubber and the reinforcing element and the distance between the reinforcing element and the carcass in the case of one rubberized layer containing the reinforcing element are required to be kept within a certain range. In addition, in the case of at least two rubberized layers, the distance between the two adjacent reinforcing elements must also be kept within a certain range. Moreover, the last mentioned distance is required to be maintained between the most protruded portions of the two adjacent reinforcing elements, so that it is necessary to use a thick rubberized layer containing the reinforcing element embedded therein, thereby significantly impeding economy. As seen from the above, the average diameter D of the outer contour projected on a plane perpendicular to the axial direction of one pitch of the filament should be 2 to 20 times larger than the diameter $\phi$ of the filament.

The pitch of the helically formed filament is suitably selected in association with modulus of elasticity of the filament, diameter $\phi$ of the filament and average diameter D projected on a plane peripendicular to the axial direction of one pitch of the filament for the purpose of obtaining the optimum elongation at the tensile breaking strength and modulus of elasticity required for the use of the tire.

The number of helically formed filaments adapted to be assembled together without twisting at random so as to provide the reinforcing element will now be described. Use may be made of one helically formed filament. In this case, however, the diameter $\phi$ of the filament necessary for obtaining the required cut resistant property of the tire becomes excessively large. As a result, the above mentioned problem occurs and at the same time the effect of improving the reinforcing element-to-rubber bonding force will be decreased. So, it is preferable to use at least two helically formed filaments.

On the contrary, if use is made of more than 50 helically formed filaments, even though the average diameter D of each of these filaments is small, the diameter of the bundle becomes excessively large. As a result, the same problem occurs as in the case of making the average diameter D excessively large.

As seen from the above, the number of helically formed filaments adapted to be assembled together without twisting at random to provide the reinforcing element is suitably selected into a range between 2 and 50, preferably, 3 to 30, by taking balance between the cut resistant property and other characteristics required for the use of tires on the one hand and economy on the other hand into consideration.

The relation between the force subjected to the reinforcing element constructed as above described according to the invention and to a conventional stranded steel cord on the one hand and elongation thereof on the other hand will now be described with reference to practical examples.

In FIG. 2 is shown tensile test results with the force in kg/cord or kg/bundle taken on ordinate and with the elongation in % on abscissa. In FIG. 2, a dotted lines cuve $\alpha$ shows a tensile test result yielded from a conventional steel cord having a strand construction of 1×5, filament diameter $\phi$ of 0.25 mm and cord diameter of 0.68 mm and full line curves $\beta$ and $\gamma$ show tensile test results yielded from reinforcing elements each composed of helically formed steel filaments according to the invention. The tensile test result shown by the full line curve $\beta$ was yielded from a reinforcing element composed of a bundle formed of 5 filaments according to the invention each having a filament diameter $\phi$ of 0.25 mm, average diameter of an outer contour projected on a plane perpendicular to the axial direction of one pitch of the filament of 0.95 mm, Dmax/Dmin=1.25, D/$\phi$=3.8, and pitch of 10.5 mm. The tensile test result shown by the full line curve $\gamma$ was yielded from a reinforcing element composed of a bundle of 14 filaments according to the invention each having a filament diameter $\phi$ of 0.175 mm, average diameter D of an outer contour projected on a plane perpendicular to the axial direction of one pitch of the filament of 1.1 mm, Dmax/Dmin=1.20, D/$\phi$=6.3 and pitch of 11 mm. In FIG. 3, a dotted lines curve $\delta$ shows a tensile test result yielded from a conventional nylon cord composed of 1,260 denier/2 strands.

As seen from FIG. 3, the reinforcing elements according to the invention provide the ideal relation between the force subjected to the reinforcing elements and the elongation thereof, which being usable for the cut protective layer for the pneumatic tire for off-road vehicles aimed at the present invention.

The use of the reinforcing element composed of a bundle of helically formed filaments according to the invention ensures a significant reduction of the compressive modulus of elasticity of the reinforcing element, so that the reinforcing element can absorb the compressive force instantaneously subjected thereto without repeating collapses, etc., thereby significantly decreasing occurrences of the cord breakage.

The difference between the compressive modulus of elasticity and compressive fatigue property of the reinforcing element according to the invention and those of the conventional standard steel cord for tires will now be described with reference to practical examples.

In FIG. 3 are shown compression test results. In FIG. 3, the compressive force in kg is taken on ordinate and the compressive strain in % is taken on abscissa. In this test, use was made of two test pieces, one of which being compoed of a cylindrical rubber containing one conventional stranded steel cord embedded therein and the other being composed of a cylindrical rubber containing one bundle constituting the reinforcing element according to the invention and embedded therein.

In FIG. 3, a dotted lines curve $\alpha$ shows the relation between the compressive force in kg subjected to the conventional stranded steel cord having a strand construction of 1×5, filament diameter $\phi$ of 0.25 mm and cord diameter of 0.68 mm and the compressive strain in % produced therein.

A full line curve $\beta$ shows the relation between the compressive force in kg subjected to the reinforcing element composed of 5 helically formed steel filaments according to the invention each having a diameter $\phi$ of 0.25 mm, average diameter D of an outer contour projected on a plane perpendicular to the axial direction of one pitch of the filament of 0.95 mm, Dmax/Dmin=1.25, D/$\phi$=3.8 and pitch of 10.5 mm and the compressive strain in % produced therein.

In FIG. 3, a dotted lines curve $\epsilon$ shows the same relation with respect to a test piece formed of rubber only. It is a matter of course that the rubber of all of these test pieces is of the same rubber compound.

As seen from FIG. 3, the compressive modulus of elasticity of the reinforcing element according to the invention is extremely small, whose value being near to a value of the rubber specimen.

In FIG. 4 is shown compressive fatigue test results. A percentage of tensile strength remained after the tensile strength has been applied to a new tire, i.e. a retained tensile strength in % is taken on ordinate and number of strains repeatedly occurred in n is taken on abscissa. In the present test, use was made of two test pieces, one of which being composed of a rectangular rubber containing a plurality of conventional stranded steel cords embedded therein and the other being composed of a rectangular rubber body containing a plurality of bundles according to the invention embedded therein, and then two test pieces were subjected to 5% repeating compressive strain in an intermittent manner.

In FIG. 4, a dotted lines curve $\alpha$ shows the retained tensile strength as a function of the number of strains repeatedly occurred for the conventional stranded steel cord having a strand construction of 1×5, filament diameter $\phi$ of 0.25 mm and cord diameter of 0.68 mm and a full line curve $\beta$ shows a relation similar to the dotted lines curve $\alpha$ for the reinforcing element according to the invention composed of 5 helically formed steel filaments each having a filament diameter $\phi$ of 0.25 mm, average diameter of an outer contour projected on a plane perpendicular to the axial direction of one pitch of the filament of 0.95 mm, Dmax/Dmin=1.25, D/$\phi$=3.8 and pitch of 10.5 mm. As seen from FIG. 4, the retained tensile strength of the reinforcing element according to the invention is far superior to that of the conventional steel cord.

As described above, the reinforcing element composed of the helically formed filaments according to the invention is liable to be deformed in an extremely easy manner so as to reduce the amount of relative displacement between the rubber and the reinforcing element. In addition, the bundle of filaments for constituting the reinforcing element is formed by merely assembling 2 to 50 filaments together without twisting at random, contrary to the conventional steel cord composed of stranded filaments. As a result, a sufficient amount of rubber can be penetrated into gaps formed between the filaments of the bundle, so that insufficient chemical rubber-to-filament bonding force can sufficiently be compensated by the mechanical bonding force, thereby exhibiting an excellent separation resistant property which is far superior to that of the conventional steel cord.

It has been found out, however, that the rubber-to-reinforcing element bonding force is limited by the industrial production base of tires, that if the tire for off-road vehicles is used under severe condition, the load subjected to it becomes excessively heavy, so that even if use is made of the reinforcing element composed of helically formed filaments, the above mentioned limit of the rubber-to-reinforcing element or the breaking strength of the rubber between two adjacent reinforcing elements is often surpassed under service condition of the tire, and as a result, if the tire is used for a relatively long time and hence repeatedly subjected to strain, the rubber near the reinforcing element or the bond of rubber-to-reinforcing element becomes slightly broken, which minute damage becomes grown and developed into the separation failure of the tire.

The inventors realize that the tire for off-road vehicles is subjected to heavy load and used under severe condition and that even if the above mentioned breaking strength is increased, its limit is often surpassed. The invention, therefore, is based on such recognition that it is preferable to increase the rubber-to-reinforcing element bonding force or the breakage resistant force of the rubber near the reinforcing element to such an extent that such increase does not significantly impede the economy of the tire manufacture on mass production scale, but to suppress such breakage to the least possible extent and prevent the growth and development of the breakage into the separation failure of the tire.

If the tire is used for a relatively long time and hence the durability thereof is important, a ratio of a pitch between two adjacent reinforcing elements to a pitch between midlines of these two reinforcing elements is given by $$\delta = \frac{S - (D + d - \phi)}{S} = 0.11 \text{ to } 0.78$$

where S is a pitch in mm between midlines of two adjacent reinforcing elements; D is an average diameter in mm of an outer contour projected on a plane perpendicular to the axial direction of one pitch of the helically formed filament; and d is an effective diameter in mm of the reinforcing element given by $$1.25 \times \sqrt{N} \times \text{filament diameter } \phi$$

where N is the number of filaments for constituting the reinforcing element.

That is, it is preferable to reduce the number of reinforcing elements per unit length or to space apart the reinforcing elements from each other by a relatively large distance.

Experimental tests have yielded the result that if $\delta$ is smaller than 0.11, the shearing force that tends to produce in the rubber surrounding the reinforcing element is rapidly increased and very narrow space between the most protruded portions of the two adjacent elements causes the above mentioned premature breakage to rapidly grow and develop into the separation failure, and that if a $\delta$ exceeds 0.78, the effect of improving the side-cut resistant property could not be attained even though use is made of a reinforcing element having an excellent cut resistant property.

In the present invention, the above described pitch S between the midlines of two adjacent elements is derived by calculation on the basis of the average number of reinforcing elements embedded in a length of 100 mm of the rubberized layer in a direction perpendicular to the axial direction of the reinforcing element in the crown center portion of the tire.

As a preferred embodiment of the invention, the arrangement of the reinforcing element composed of helically formed filaments in the rubberized layer will now be described.

At least one rubberized layer containing the above described reinforcing element embedded therein and formed of helically formed filaments is used as the side portion reinforcing layer. In bias tires, the reinforcing element is inclined at an angle of 70° to 10°, preferably 60° to 20° with respect to the equatorial line of the tire. In radial tires, the reinforcing element is inclined at an angle of at most 70°, preferably at most 30° with respect to the equatorial line of the tire.

In order to improve the side-cut preventive effect of the tire, it is preferable that the side portion reinforcing layer is composed of at least two layers and the reinforcing elements embedded in these layers are extended along opposite directions symmetrically inclined at an angle with respect to the equatorial line of the tire so as to form a mesh-shaped cut preventive layer.

As rubber which constitutes together with the reinforcing element the side portion reinforcing layer, use may be made of a rubber compound having a Shore A hardness at room temperature of 50° to 85°, 300% modulus of elasticity of 80 kg/cm$^2$ to 230 kg/cm$^2$, tensile breaking strength of 150 kg/cm$^2$ to 250 kg/cm$^2$ and tensile breaking strength at 100° C. of 75 kg/cm$^2$ to 160 kg/cm$^2$. In order to further improve the separation resistant property of the tire, it is preferable to locate a rubber layer formed of a rubber compound having a higher modulus of elasticity within the above mentioned range near the reinforcing element and locate a rubber layer formed of a rubber compound having a lower modulus of elasticity within the above mentioned range outside the above mentioned rubber. That is, the rubberized layer of the side portion reinforcing layer is composed of two rubber layers construction in which the modulus of elasticity thereof is changed in a stepwise manner.

In the case of using one rubberized layer, it is preferable to use the rubber compound having the lower modulus of elasticity within the above mentioned range for the pneumatic tire adapted for use in heavy load, low speed and short life vehicles such as a loader and the like and use the rubber compound having the higher modulus of elasticity within the above mentioned range for the pneumatic tire adapted for use in relatively ligh load, high speed and long life vehicles such as a dump truck, scraper and the like. More particularly, it is advisable for ends of the reinforcing element to use the rubber compound having the high modulus of elasticity.

In short, the use of the above described reinforcing element as the side portion reinforcing layer ensures the following effects.

(1) The reinforcing element has an elongation at tensile breaking strength within a range which is necessary and sufficient with respect to the elongation at tensile breaking strength of the carcass cord and hence exhibits significantly excellent side-cut resistant property for all types of side-cuts.

(2) The reinforcing element is composed of helically formed filaments which give a necessary elongation. In this case, the stress caused by extension or compression in the lengthwise direction of the filament is substantially uniformly distributed over any portion thereof in its lengthwise direction. In addition, this stress is torsional shearing stress which is liable to be distributed in a relatively uniform manner, and as a result, it is possible to completely prevent fatigue breakage.

(3) The reinforcing element is liable to be deformed in an extremely easy manner so as to reduce the amount of relative displacement between the rubber and the reinforcing element, so that separations occurred at the ends and any other portions of the reinforcing element can be reduced. In addition, the bundle of helically formed filaments for constituting the reinforcing element is formed by merely assembling 2 to 50 filaments together with twisting at random, but is not stranded as in the case of the conventional steel cord. As a result, a sufficient amount of rubber can be penetrated into gaps formed between the filaments of the bundle, so that insufficient chemical rubber-to-filament bonding force can sufficiently be compensated by the mechanical bonding force, thereby exhibiting an excellent separation resistant property.

In addition, the amount of relative displacement between the rubber surrounding the ends of the reinforcing element and the carcass cord layer is significantly reduced, and as a result, use may be made of the rubber projection provided for the conventional first type tire or the thick side wall provided for the conventional second type tire.

(4) The reinforcing element has a considerably low compressive modulus of elasticity and hence can absorb instantaneously acting compressive force, and as a result, there is no risk of the reinforcing element being repeatedly subjected to buckling, etc., thereby significantly reducing occurrence of "cord breakage".

(5) The side portion reinforcing layer which makes use of the reinforcing element is not inextensible, not incompressible and not highly rigid contrary to the conventional side portion reinforcing layer which makes use of the steel cord, but is highly flexible, extensible and compressible, and as a result, the side portion reinforcing layer tends to effectively refrain from the side portion bending rigidity, thereby preventing the bead portion from being subjected to concentration of strain. Thus, it is possible to completely prevent the durability of the bead portion from being reduced.

As seen from the above, "the reinforcing element composed of helically formed filaments or a bundle thereof and having a necessary and sufficient elongation at tensile breaking strength" exhibits extremely excellent side-cut resistant property for all types of side-cuts and at the same time can obviate all of the disadvantages which have been encountered with the conventional side-cut resistant tire, thereby significantly improving the overall durability of the tire.

In carrying out the invention into effect, the side portion reinforcing layer constructed as above described is generally disposed between the outer rubber layer of the side portion and the carcass. But, the side portion reinforcing layer may also be disposed within the outer rubber layer of the side portion or disposed between carcass ply layers near the outer rubber layer of the side portion.

The widthwise position of the side portion reinforcing layer according to the invention may preferably be extended from near the rim line through the maximum width position of the tire to substantially near the shoulder portion and to substantially overall region of the tire side portion. But, the widthwise position of the side portion reinforcing layer is not limited to such position only. If necessary, the side portion reinforcing layer may continuously be extended from the bead toe through the tire maximum width position into the crown portion. In addition, in order to reinforce the bead portion, the side portion reinforcing layer may be turned up from the bead toe portion into the tire inner surface, and eventually may continuously extended from one of bead toe portions through the crown portion to another bead toe portion.

In addition, the side portion reinforcing layer may suitably be divided in its widthwise direction into any number of sections which are spaced apart from each other and which may be superimposed one upon the other. In general, the side portion reinforcing layer is arranged symmetrically with respect to the equatorial line of the tire. One of these layers may be formed of two layers and the other layer may be formed of one layer. Alternatively, the position and width of one of these layers may be different from those of the other layer. Eventually, the side portion reinforcing layer may be disposed on one side only of the tire. That is, the widthwise position of the side portion reinforcing layer according to the invention may suitably be selected as is required by the side cut resistant property of the tire.

In addition, the side portion reinforcing layer may be co-existent with the rubber projection provided for the conventional first type tire or with the thick side wall provided for the conventional second type tire.

Use may be made of at least one additional rubberized layer containing cords composed of organic fiber such as nylon and the like embedded therein. Such additional rubberized layer may be superimposed about that portion of the side portion reinforcing layer according to the invention which is located near the tire sidewall over a width which is wider than the width of the side portion reinforcing layer or may be superimposed about each side edge only of the side portion reinforcing layer, thereby improving the separation resistant property of the tire.

The organic fiber cord usable for the carcass ply and the above mentioned additional layer may be formed of nylon, rayon, vinylon (polyvinyl alcohol), polyester and the like. The helically formed filament constituting the reinforcing element of the side portion reinforcing layer may be formed of metal wire having an improved rubber-to-wire bonding property or treated so as to improve it, for example, brass plated steel wire, aromatic polyamide fiber having a high modulus of elasticity, glass fiber.

A pneumatic tire for construction vehicles embodying the invention will now be described with reference to practical examples.

EXAMPLE 1

In FIG. 5 is shown a cross-section of one-half of a tire, parts being shown in vertical center section through the rotational axis of the tire. The tire shown in FIG. 5 is of a third kind of tire for construction vehicles, that is, a wide base tire having a regular tread and a size of 17.5-25 12PR being indicated on the basis of cotton yarn.

The tire shown in FIG. 5 comprises a bead portion 1 composed of two sets of bead cores 1a, 1b and a carcass ply 2 composed of 8 plies each formed of nylon cord of 1,260 denier/2 strands.

4 plies 2a of the total 8 plies are wound about the bead core 1 from the inside toward the outside thereof and secured to the bead portion 1. Similarly, 2 plies 2b of the total 8 plies are wound about the bead core 1b from the inside toward the outside thereof and secured to the bead portion 1. Finally 2 outermost plies 2c are extended from the outside along the lower surface of the bead cores 1b, 1a toward the inside thereof and secured at their inner ends to a toe portion 1c of the bead portion 1.

The cords of these carcass plies are disposed in each of the plies and extended along two directions symmetrically inclined at an angle of approximately 36° with respect to the equatorial lines of the tire.

About these carcass plies 2 are superimposed two side portion reinforcing layers 7a, 7b each composed of a reinforcing element formed of a bundle of helically formed filaments and extending in a side portion 3 over substantially overall region thereof. Each of these side portion reinforcing layers 7a, 7b is composed of a rubberized layer containing a bundle of 5 helically formed steel filaments. Each filament has a diameter $\phi$ of 0.25 mm, average diameter D of an outer contour projected on a plane perpendicular to the axial direction of one pitch of the filament of 0.95 mm, Dmax/Dmin=1.25, $D/\phi = 3.8$ and pitch of 10.5 mm. The number of the reinforcing filaments per 10 cm of the rubberized layer is approximately 32. These reinforcing elements are disposed in each of the rubberized layers and extended along two directions symmetrically inclined at an angle of approximately 38° with respect to the equatorial line of the tire.

This reinforcing element is the same in construction as that having the test result shown by the curve $\beta$ in FIG. 2. The helically formed filament constituting the reinforcing element is formed of material having a tensile breaking strength of 280 kg/mm$^2$ and the reinforcing element has an elongation at tensile breaking strength which is 0.34 times that of the carcass cord. The ratio $\delta$ is 0.47.

EXAMPLE 2

In FIG. 6 is shown a cross section of one-half of a tire, parts being shown in vertical center section through the rotational axis of the tire. The tire shown in FIG. 6 is of a first kind of tire for construction vehicles, that is, an ordinary tire having an extra tread and a size of 18.00-25 32PR, 32PR being indicated on the base of cotton yarn.

The tire shown in FIG. 6 comprises a bead portion 1 composed of 3 sets of inner, intermediate and outer bead cores 1a, 1b and 1c, respectively, and a carcass ply 2 composed of 22 plies each consisting of nylon cord of 1,260 denier/2 strands.

8 plies 2a of the total 22 plies (shown by 2 lines in FIG. 6) are wound about the inner bead core 1a from the inside toward the outside thereof and secured to the bead portion 1. 6 intermediate plies 2b of the total 22 plies (shown by 2 lines in FIG. 6) are similarly wound about an intermediate bead core 1b from the inside toward the outside thereof and secured to the bead portion 1. 4 inside plies 2c' of 8 outer plies 2c of the total 22 plies are wound about the outer bead core 1c from the inside toward the outside thereof and secured to the bead portion 1. Finally, 4 outside plies 2c'' of the 8 outer plies 2c of the total 22 plies are extended along the lower surface of the outer, intermediate and inner bead cores 1c, 1b and 1a, respectively, and secured at their inner ends to a toe portion 1d of the bead portion 1.

The cords of these carcass plies are disposed in each of the plies and extended along two directions symmetrically inclined at an angle of approximately 35° with respect to the equatorial line of the tire.

About these carcass plies 2 are superimposed a side portion reinforcing layer 7 extending acrosss substantially overall region of a side portion 3. The side portion reinforcing layer 7 is composed of a reinforcing element formed of helically formed filaments. In the present embodiment, the side portion reinforcing layer 7 is composed of a rubberized reinforcing element containing 14 helically formed steel filaments each having a diameter of 0.175 mm, average diameter D of an outer contour projected on a plane perpendicular to the axial direction of one pitch of the filament of 1.1 mm, Dmax/Dmin=1.20, $D/\phi=6.3$ and pitch of 11 mm. The number of the reinforcing elements per 10 cm of the rubberized layer is approximately 30. These reinforcing elements are disposed in each of the rubberized layer and extended along two directions symmetrically inclined at an angle of approximately 40° with respect to the equatorial line of the tire.

The reinforcing element is the same as that having the test result shown by the curve γ in FIG. 2. The helically formed filament per se has a tensile breaking strength of 280 kg/mm² and the reinforcing element has the elongation at tensile breaking strength which is 0.75 times that of the carcass cord. The ratio δ is 0.42.

EXAMPLE 3

In FIG. 7 is shown a cross section of one-half of a tire, parts being shown in vertical center section through the rotational axis of the tire. The tire shown in FIG. 7 is of a first kind of tire for construction vheicles, that is, an ordinary tire having an extra tread and a size of 18.00-25 32PR, 32PR being indicated on the basis of cotton yarn.

The tire shown in FIG. 7 comprises a rubberized carcass ply 2 composed of 6 plies each consisting of aromatic polyamide fiber cord having a high modulus of elasticity and composed of 1,500 denier/3 strands. These 6 plies are embedded in the rubberized carcass ply 2 and extended along the radial plane of the tire. Each of these ply cores has a tensile breaking strength of 73 kg/cord and elongation at tensile breaking strength of 13%. The number of these carcass plies at the crown center of the tire is 5 cords/25 mm.

The carcass ply 2 is made toroidal in shape and is wound about a pair of bead cores 1 from the inside toward the outside thereof to form a turn-up portion. This turn-up portion has a tapered end so as to prevent stress from becomming concentrated at the end of the turn-up portion.

The bead portion formed by the turn-up portion of the carcass ply 2 is surrounded by a rubberized chafer 11 containing a steel cord having a strand construction of (1×3)×0.18 mm+9×0.18 mm+(9×4)×0.18 mm+0.1 mm. The steel cord of the chafer 11 is inclined at about 60° with respect to the equatorial line of the tire.

Within triangular portion formed by the carcass ply 2, its turn-up portion and bead core 1 is inserted a bead filler 12 formed of a hard rubber having a Shore A hardness of 84°.

Between the carcass ply 2 and a tread 5 at the crown portion of the tire is arranged a belt 13 composed of 4 reinforcing layers, these layers being designated by 1B, 2B, 3B, 4B in the order viewed from the carcass side and having the following construction.

A side portion reinforcing layer 7 is arranged in such shape that it can protect the carcass ply extending from the belt end to the side portion. The side portion reinforcing layer 7 has its one end located at a position which is slightly higher than the upper end of the chafer 11 and another end extended over the end of the belt having the smallest width to a position which is located near the crown center.

The side portion reinforcing layer 7 is composed of one rubberized layer containing reinforcing elements each formed of a bundle of 8 helically formed filaments embedded therein. Each of the helically formed filaments constituting the reinforcing element has a diameter $\phi$ of 0.25 mm, average diameter D of an outer contour projected on a plane perpendicular to the axial direction of one pitch of the filament of 2.3 mm, $D_{max}/D_{min}=1.5$, $D/\phi=9.2$ and pitch of 11 mm. The number of these reinforcing elements per 25 mm of the rubberized layer is 6.5. The reinforcing elements are made in parallel with the equatorial line of the tire.

Each of the helically formed filaments constituting the reinforcing element has a tensile breaking strength of 280 kg/mm². Each of the reinforcing elements has an elongation at tensile breaking strength which is 0.55 times that of the carcass cord and the ratio δ is 0.16.

The belt end of the radial tire is poor in durability and scratches produced therein constitute a nucleus which often tends to develope into cut separation failure. The use of the measure of protecting that region of the tire which is extended from the belt end to the side portion according to the present invention provides an excellent cut preventive construction.

Experimental tests have yielded the result that when the tire constructed as above described with reference to the above mentioned various embdoiments run on off-road, described effect of preventing the side-cut aimed at the present invention can be obtained.

Figure 8:
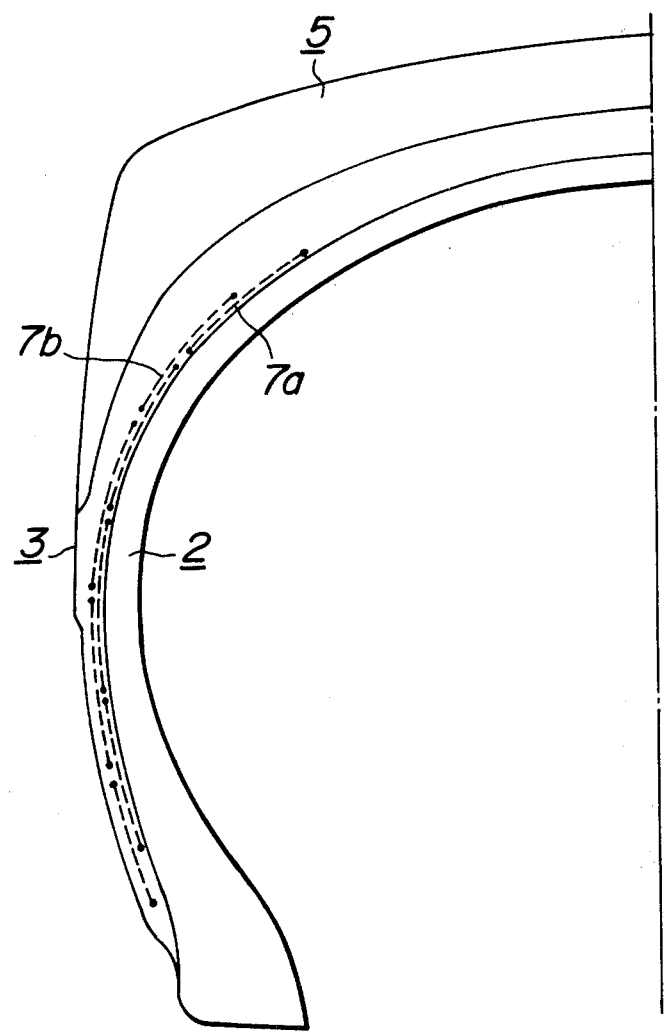
FIGS. 8 to 22 are cross-sectional views showing various modified embodiments of the tire according to the invention, parts being shown in vertical center section through the rotational axis of the tire.

In FIG. 8 is shown a modified embodiment of the tire according to the invention. In the present embodiment, side portion reinforcing layers 7a, 7b are divided into a plurality of sections in their widthwise direction, respectively, the sections being spaced apart from each other and arranged along the outer surface of the carcass ply 2.

Figure 9:
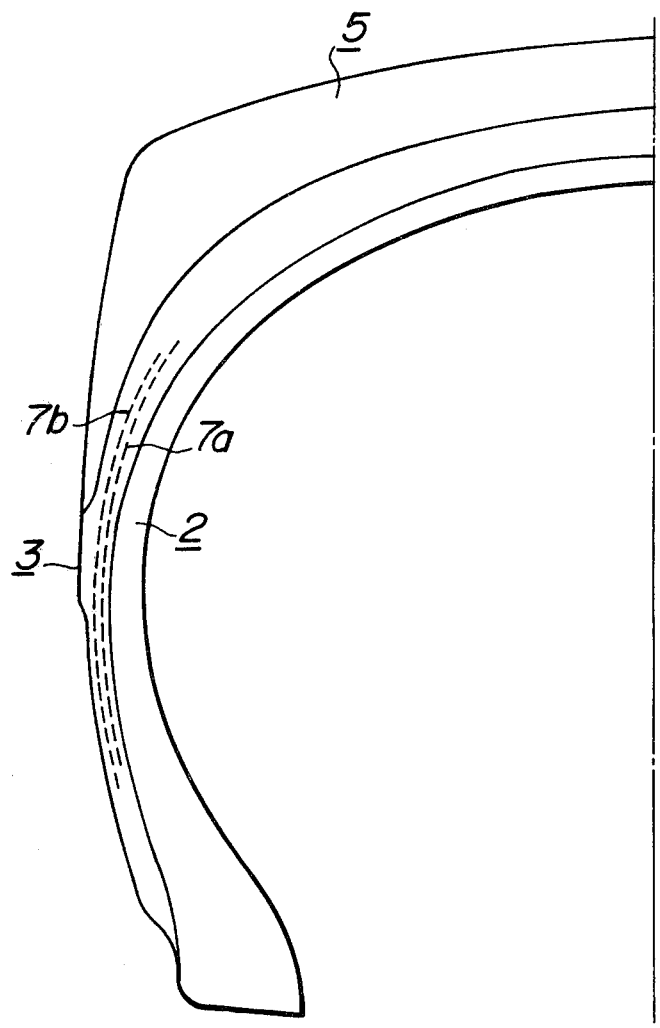

In FIG. 9 is shown another modified embodiment of the tire according to the invention. In the present embodiment, both the side portion reinforcing layers 7a, 7b are arranged within an outer rubber of the side portion 3.

Figure 10:
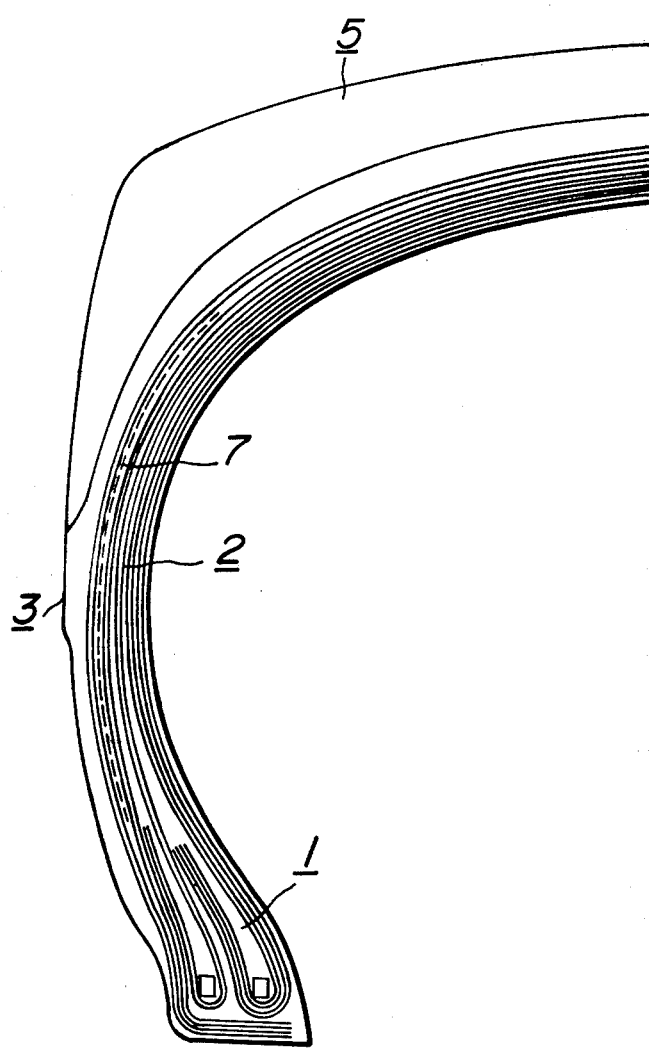

In FIG. 10 is shown a further modified embodiment of the tire according to the invention. In the present embodiment, a side portion reinforcing layer 7 is interposed between those carcass plies 2 which are located near the side portion 3.

Figure 11:
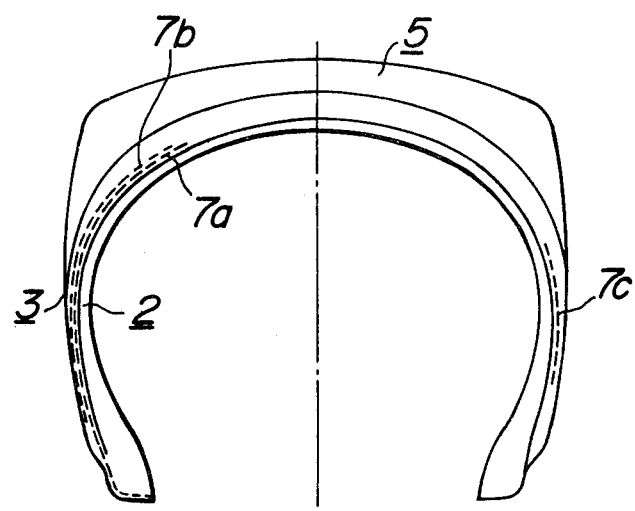

In FIG. 11 is shown a still further modified embodiment of the tire according to the invention. In the present embodiment, side portion reinforcing layers 7a, 7b and a side portion reinforcing layer 7c are arranged

|  | Steel cord | Steel cord tensile breaking strength | Elongation | Angle with respect to circumferential direction of tire | Width | Number of steel cords |
|---|---|---|---|---|---|---|
| 1B | (7 × 7) × 0.21 mm + 0.21 mm | 410 kg | 2.6% | 40° | 400 mm | 8 cords/25 mm |
| 2B | " | " | " | 27° | 360 mm | " |
| 3B | " | " | " | " | 290 mm | " |
| 4B | " | " | " | " | 330 mm | " | asymmetrically with respect to the equatorial line of the tire and located at respective side portions 3, respectively.

Figure 12:
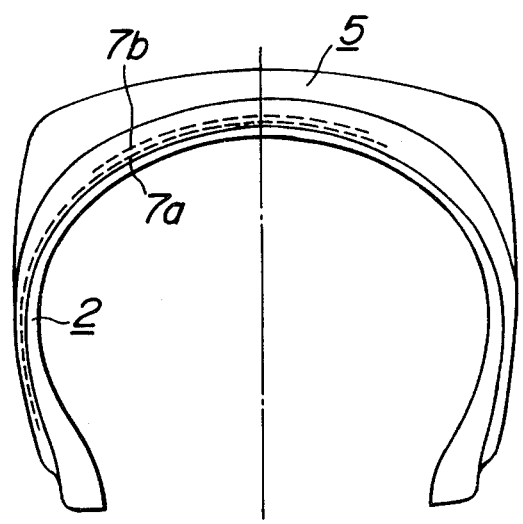

In FIG. 12 is shown another modified embodiment of the tire according to the invention. In the present embodiment, side reinforcing layers 7a, 7b are also arranged asymmetrically with respect to the equatorial lines of the tire.

Figure 13:
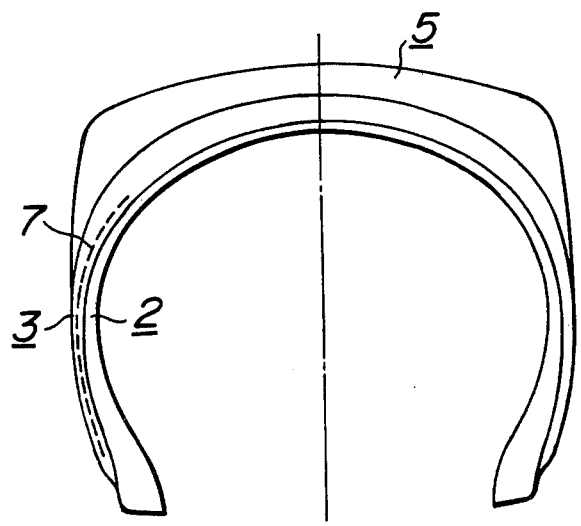

In FIG. 13 is shown a further modified embodiment of the tire according to the invention. In the present embodiment, a side portion reinforcing layer 7 is arranged on one side portion 3 only.

Figure 14:
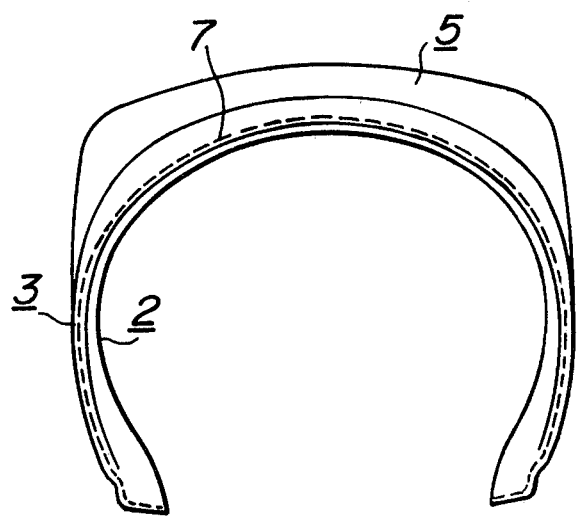

In FIG. 14 is shown a still further modified embodiment of the tire according to the invention. In the present embodiment, a side portion reinforcing layer 7 is continuously extended from one of the bead portions through the crown portion to the other bead portion.

Figure 15:
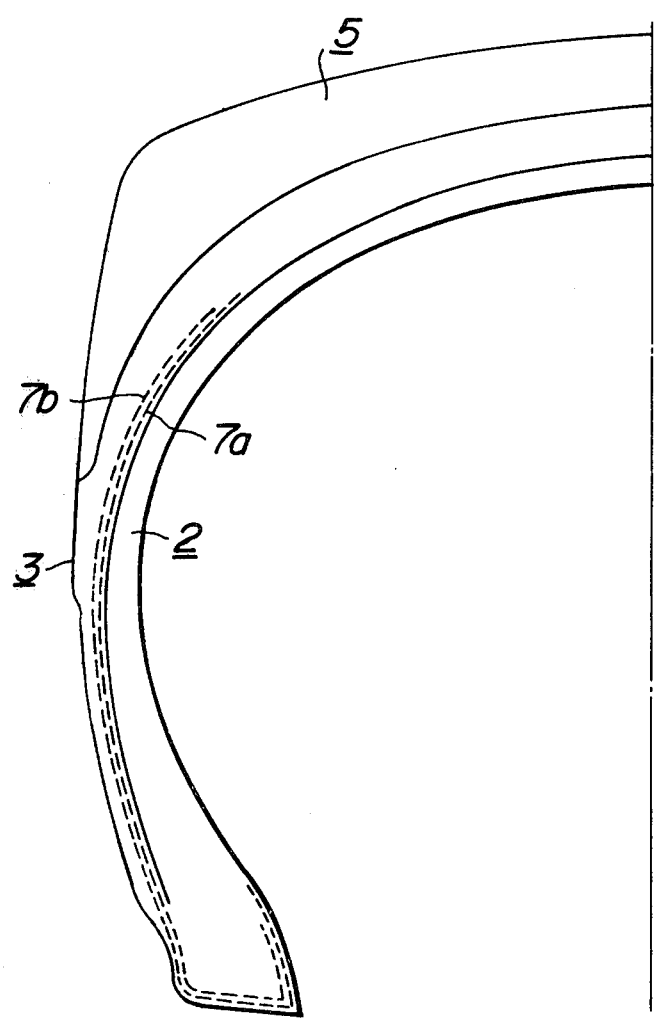

In FIG. 15 is shown another modified embodiment of the tire according to the invention. In the present embodiment, two side portion reinforcing layers 7a, 7b are extended through the bead toe portion up to the inside surface of the tire thus winding about the bead portion to form turn-up portions.

Figure 16:
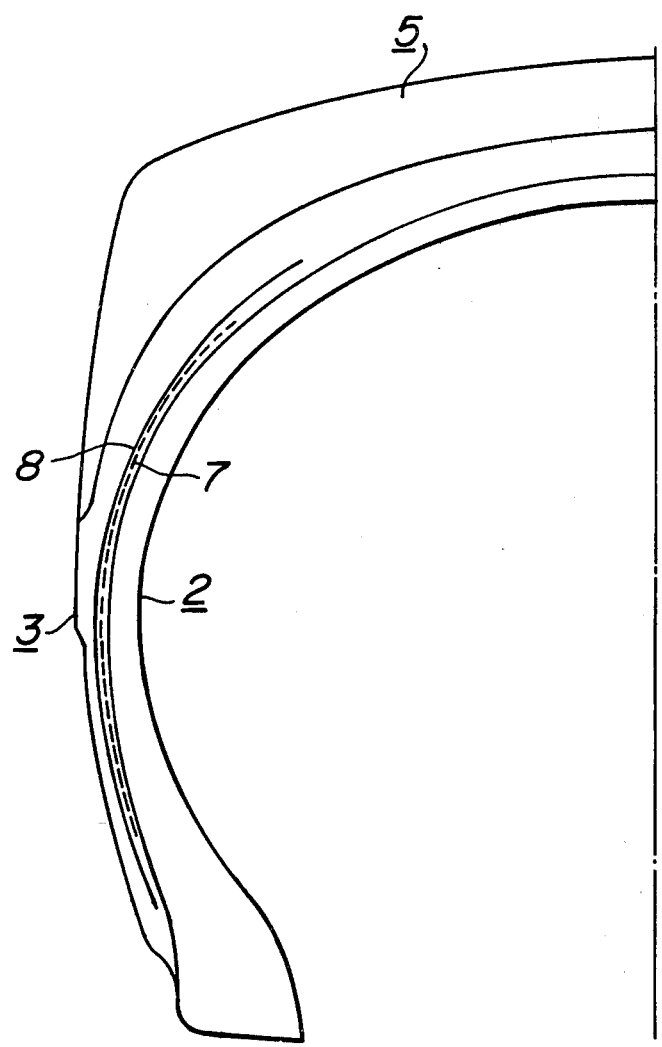

In FIG. 16 is shown a further modified embodiment of the tire according to the invention. In the present embodiment, about a side portion reinforcing layer 7 is superimposed an additional layer 8.

Figure 17:
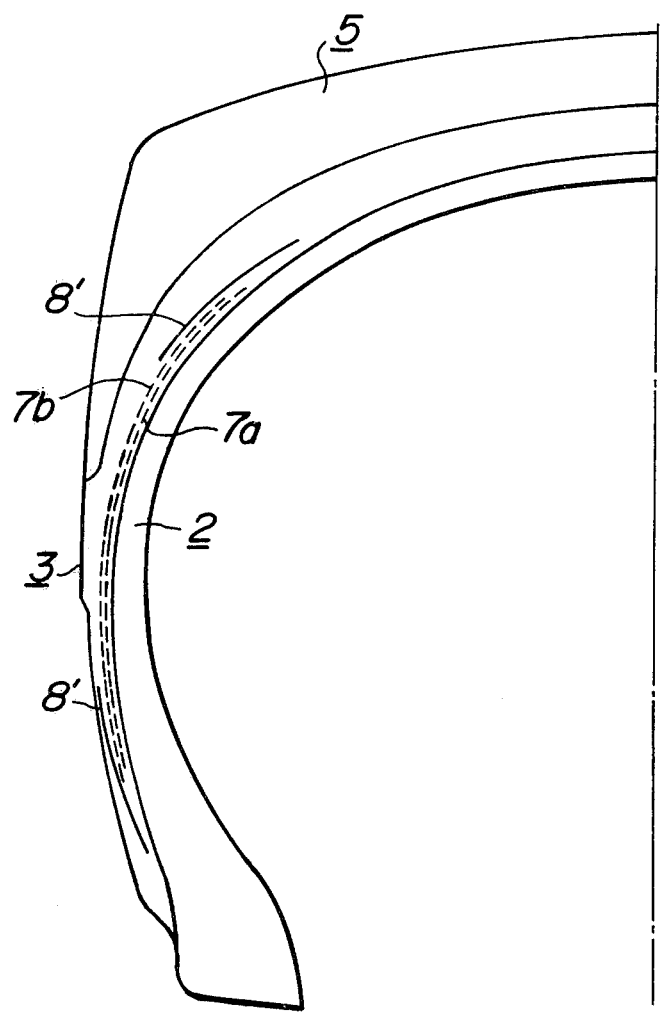

In FIG. 17 is shown a still further modified embodiment of the tire according to the invention. In the present embodiment, two side portion reinforcing layers 7a, 7b are provided at their side portions only with additional layers 8', 8', superimposed thereabout, respectively.

Figure 18:
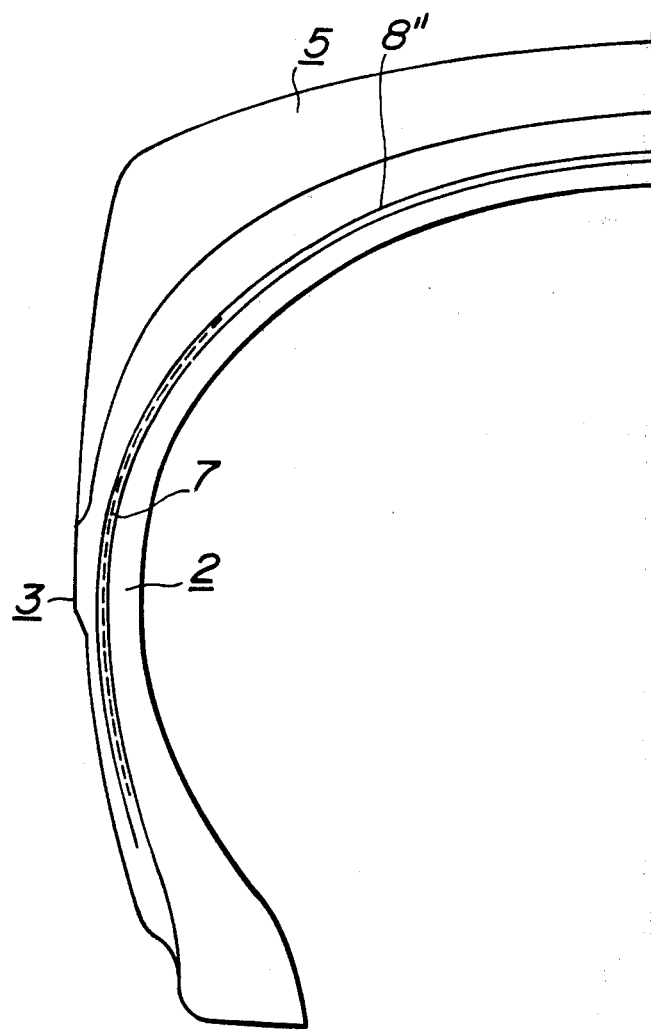

In FIG. 18 is shown another modified embodiment of the tire according to the invention. In the present embodiment, an additional layer 8" is continuously extended from one side portion 3 through the crown portion to the other side portion (not shown).

Figure 19:
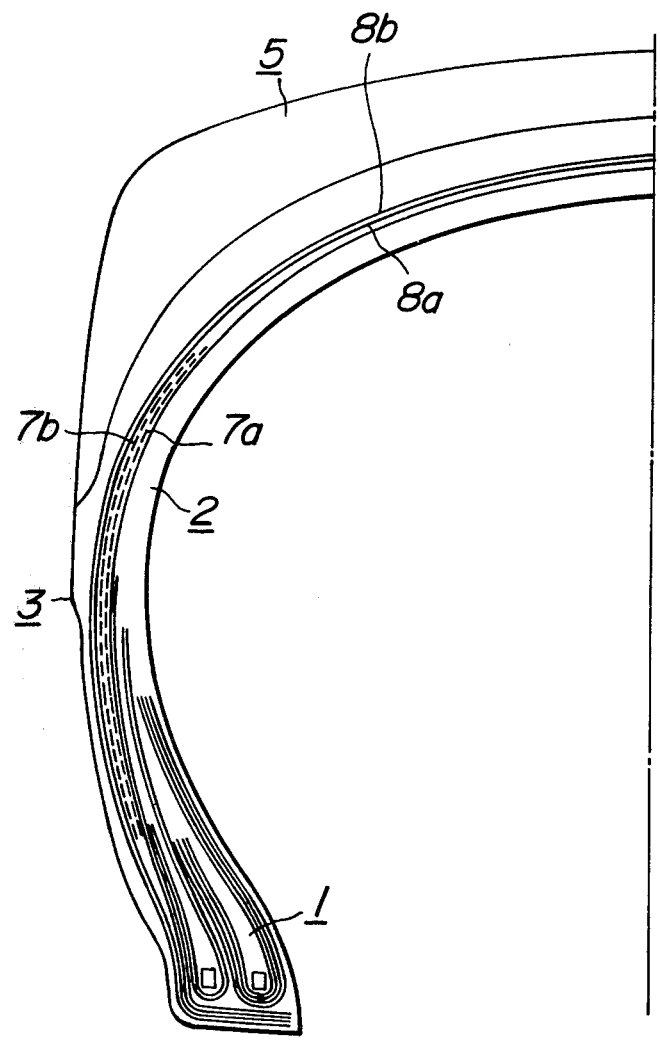

In FIG. 19 is shown a further modified embodiment of the tire according to the invention. In the present embodiment, two additional layers are composed of rubberized bias fabrics 8a, 8b each containing cords embeded therein and crossed with cords associated with the oth bias fabric. These two additional layers 8a, 8b are extended from one of the bead toe portions through the crown portion up to the other bead toe portion (not shown) so as to constitute one portion of the carcass ply of the bias tire.

Figure 20:
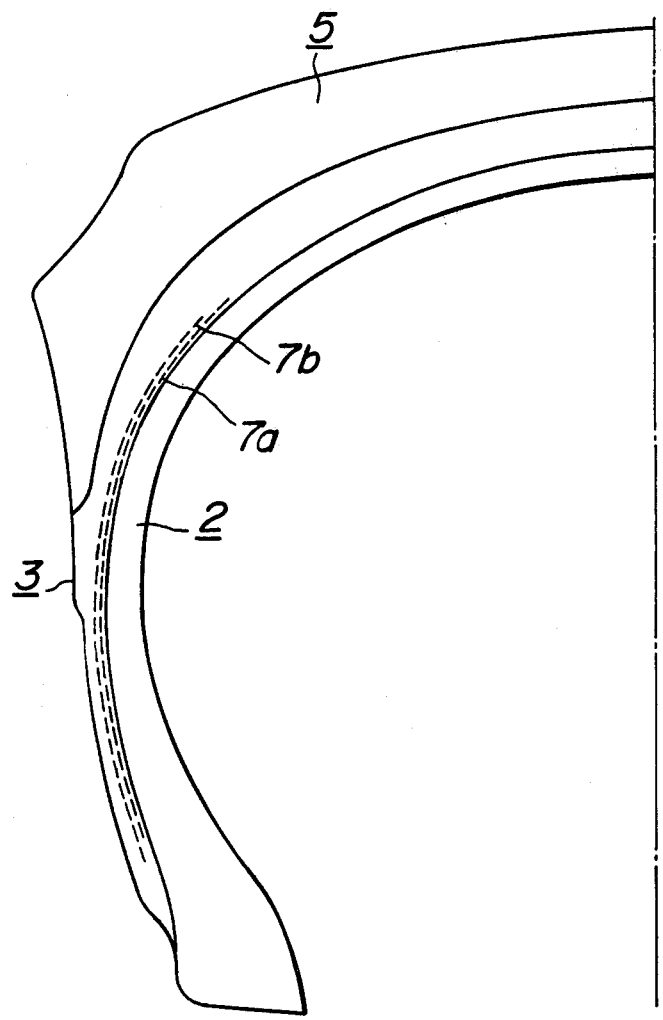
Figure 21:
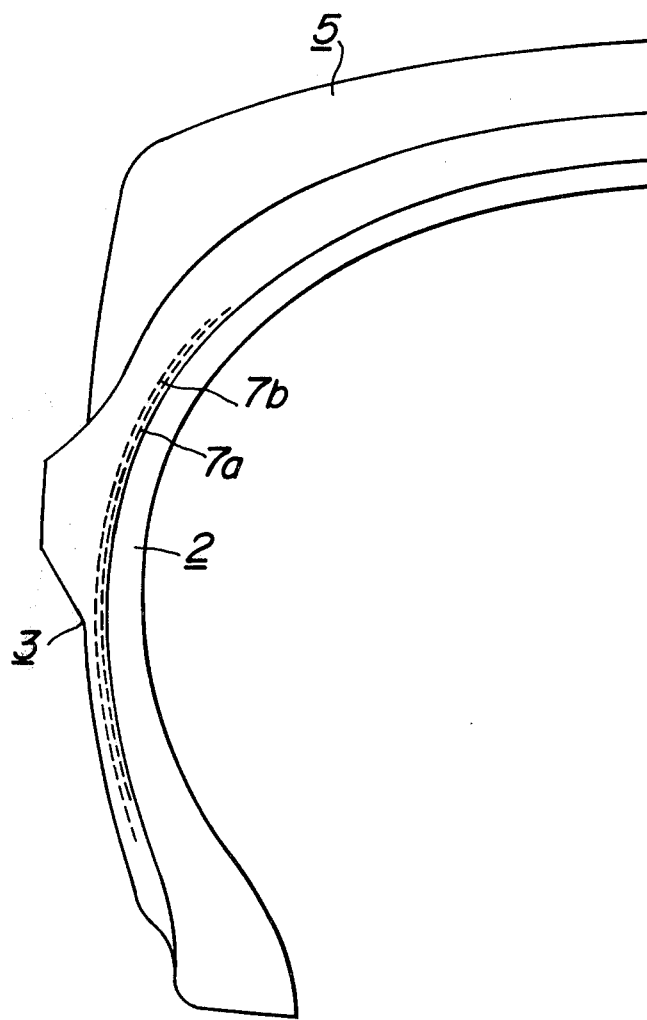

In FIGS. 20 and 21 are shown still further modified embodiments of the tire according to the invention. In the present embodiments, two side portion reinforcing layers 7a, 7b are applied to the above described conventional first type tires each provided with a rubber projection.

Figure 22:
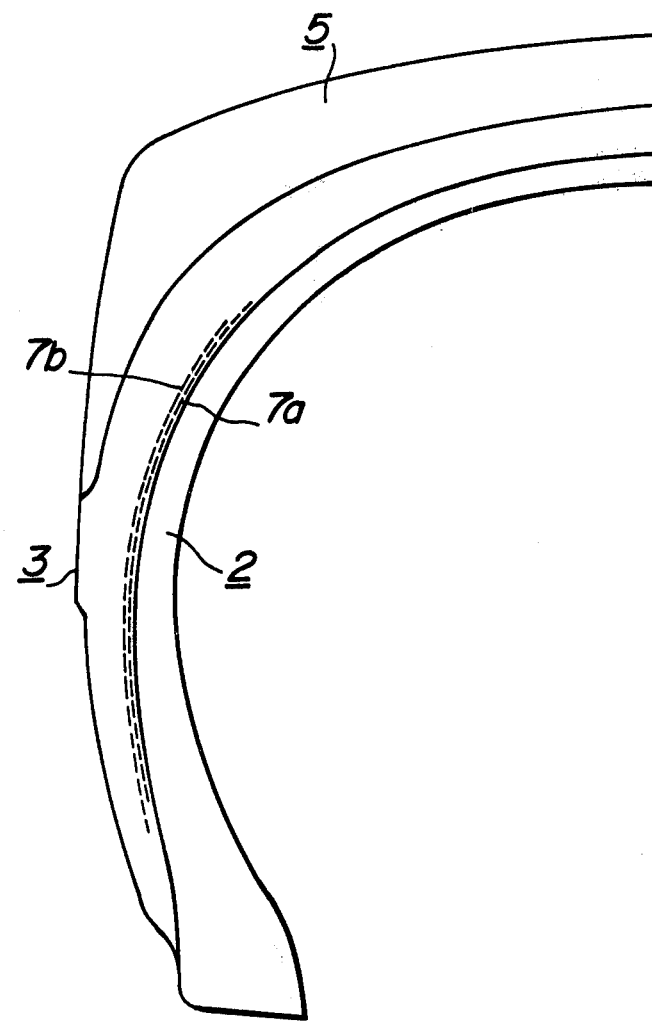

In FIG. 22 is shown another modified embodiment of the tire according to the invention. In the present embodiment, two side portion reinforcing layers 7a, 7b are applied to the above described conventional second type tire having a thick side wall.

Figure 23:
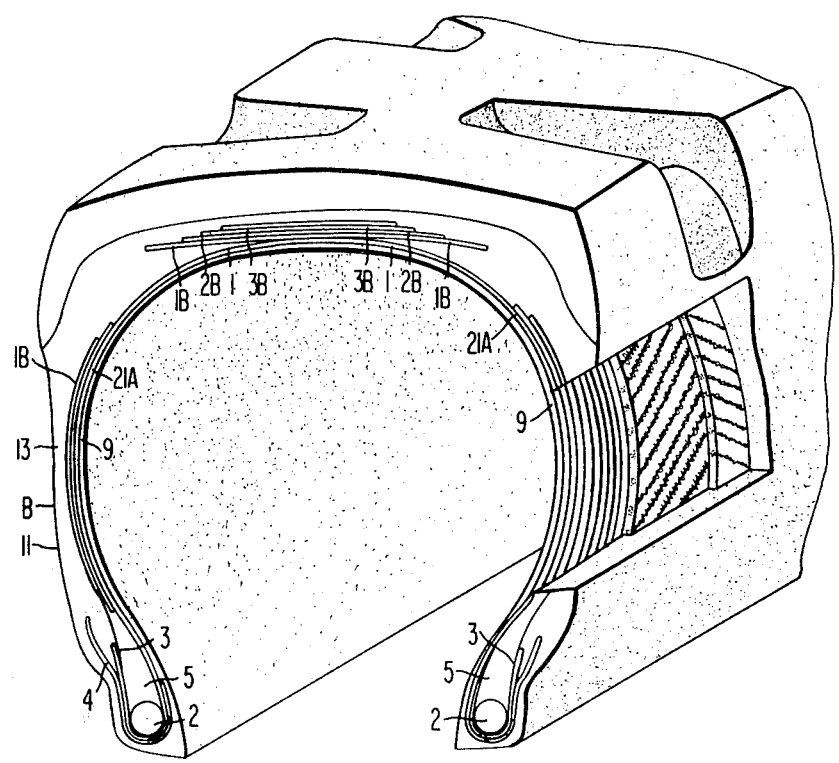
FIG. 23 is a partially cross-sectioned perspective view of the tire of the invention showing helically formed filaments formed into bundles in reinforcing layers and in which the cords are radial cords.
Figure 24:
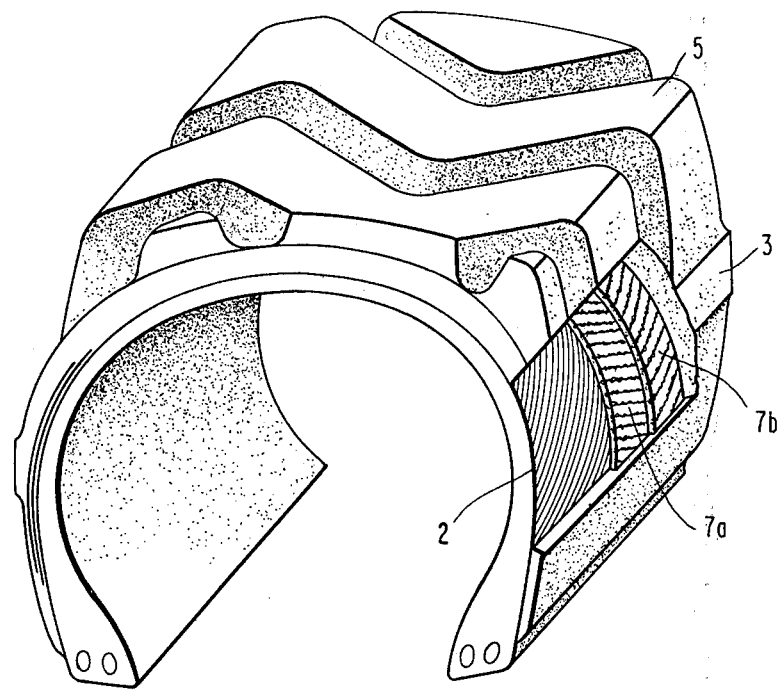
FIG. 24 is a partially cross-section perspective view of the tire of the invention showing helically formed filaments formed into bundles in reinforcing layers and in which the cords are a biased cord construction.

The embodiments of the tire according to the invention shown in FIGS. 8 to 12 are of bias constructions, but these embodiments may also be applied to radial construction tires. FIGS. 23 and 24 are partially cross-section perspective views of tires in accordance with this invention showing helically formed filaments formed into bundles in the reinforcing layers. FIG. 23 shows a construction utilizing radial cords and FIG. 21 shows a construction showing biased cords.

The above described embodiments are explained with reference to a large size tire for construction vehicles. The invention is not limited to such use only, but may also be applied to two or four wheeled vehicles which are used for an endurance contest in which the vehicles run on desert, off-road, etc. over a distance on the order of 2,000 km for several days.

What is claimed is:

1. A pneumatic tire for off-road vehicles comprising a reinforcing element composed of helically formed filaments and having an excellent side-cut resistant property, comprising a toroidal-shaped carcass body composed of a plurality of rubberized ply layers superimposed one upon the other and each containing organic fiber cords embedded therein, a side portion formed of a rubber coating made integral with both said carcass body and a tread portion, and a side portion reinforcing layer arranged in said side portion and for preventing cuts subjected to the surface of said side portion, said side portion reinforcing layer being composed of at least one rubberized layer containing a reinforcing element embedded therein and formed of 3 to 30 helically formed filaments, each filament having a diameter $\phi$ of 0.13 to 0.5 mm and made of material having a tensile breaking strength of at least 140 kg/mm², said reinforcing element having an elongation at tensile breaking strength which is 0.15 to 1.7 times that of organic cord of the ply of the carcass body, and said rubberized layer as a whole being extensible, wherein said reinforcing element has a ratio $\delta$ defined by $$\delta = \frac{\{S - (D + d - \phi)\}}{S} = 0.11 \text{ to } 0.7$$

where S is a pitch in mm between midlines of the two adjacent reinforcing elements; d is an effective diameter in mm of the reinforcing element defined by $$1.25 \times \sqrt[4]{N} \times \phi$$

where N is the number of filaments for constituting the reinforcing element, $\phi$ is the diameter of a helically formed filament and D is the average diameter of an outer contour projected on a plane perpendicular to the axial direction of one pitch of a filament wherein, $D = D_{max} + D_{min}/2$ is in the range of $2\phi$–$20\phi$.

2. A pneumatic tire for off-road vehicles comprising a reinforcing element composed of helically formed filaments and having an excellent side-cut resistant property, comprising a toroidal-shaped carcass body composed of a plurality of rubberized ply layers superimposed one upon the other and each containing organic fiber cords embedded therein, a side portion formed of a rubber coating made integral with both said carcass body and a tread portion, and a side portion reinforcing layer arranged in said side portion and for preventing cuts subjected to the surface of said side portion, said side portion reinforcing layer being composed of at least one rubberized layer containing a reinforcing element embedded therein and formed of a helically formed filament bundle of 3 to 30 helically formed filaments assembled together without twisting at random, each filament having a diameter $\phi$ of 0.13 to 0.5 mm and each made of material having a tensile breaking strength of at least 140 kg/mm², said reinforcing element having an elongation at tensile breaking strength which is 0.15 to 1.7 times that of organic cord of the ply of the carcass body, said reinforcing element has a ratio $\delta$ defined by $$\delta = \frac{\{S - (D + d - \phi)\}}{S} = 0.11 \text{ to } 0.7$$

where S is a pitch in mm between midlines of the two adjacent reinforcing elements; d is an effective diameter in mm of the reinforcing element defined by $$1.25 \times \sqrt{N} \times \phi$$

where N is the number of filaments for constituting the reinforcing element, $\phi$ is the diameter of a helically formed filament and D is the average diameter of an outer contour projected on a plane perpendicular to the axial direction of one pitch of a filament wherein, $D = D_{max} + D_{min}/2$ is in the range of $2\phi$–$20\phi$ and said rubberized layer as a whole being extensible, said reinforcing layer extending from the crown portion of the tire to a region above the bead region of the tire at a position above the point at which the upper edge of a rim on which the tire is mounted meets the tire.

3. A pneumatic tire according to either claim 1 or 2, wherein said helically formed filament constituting said reinforcing element is formed of a steel wire.

4. A pneumatic tire according to either claim 1, or 2 wherein said rubberized layer of said side portion reinforcing layer containing said reinforcing element embedded therein is formed of a rubber compound having a Shore A hardness of 50° to 85°, 300% modulus of elasticity of 80 kg/cm$^2$ to 230 kg/cm$^2$ and tensile breaking strength of 150 kg/cm$^2$ to 250 kg/cm$^2$.

5. A pneumatic tire according to claim 4 wherein said rubberized layer of said side portion reinforcing layer is composed of two rubber layers, one rubber layer located near the reinforcing element being formed of a rubber compound having a higher modulus of elasticity within said range of modulus of elasticity and another rubber layer located outside said rubber layer being formed of a rubber compound having a lower modulus of elasticity within said range of modulus of elasticity, whereby the separation resistant property of the tire is further improved.

6. A pneumatic tire according to either claim 1 or 2, wherein said carcass body is of a bias construction in which about one-half of said plurality of ply cords for constituting the carcass body are arranged in a direction which is opposite to a direction of the remainder of ply cords.

7. A pneumatic tire according to either claim 1 or 2, wherein said carcass body is of a substantially radial construction in which the ply cords of said carcass body are arranged in or substantially in parallel with a plane inclusive of the vertical center section through the rotational axis of the tire.

8. A pneumatic tire according to either claim 1 or 2, wherein said side portion reinforcing layer is independently arranged in each side portion of the tire.

9. A pneumatic tire according to claim 1, wherein said side portion reinforcing layer is continuously extended from one of the side portions through a crown portion to the other side portion.

10. A pneumatic tire according to either claim 1 or 2, wherein said side portion reinforcing layer is arranged along the outside of said carcass body.

11. A pneumatic tire according to either claim 1 or 2, wherein said side portion reinforcing layer is arranged near said coating rubber of said side portion and interposed between said plies of said carcass body.

12. A pneumatic tire according to either claim 1 or 2, wherein said side portion reinforcing layers are superimposed one upon the other and arranged along the outer surface of said carcass body each of said side portion reinforcing layers being divided into a plurality of sections in its widthwise direction, the sections being spaced apart from each other.

13. A pneumatic tire according to either claim 1 or 2, wherein an additional layer composed of at least one organic fiber cord layer is arranged outside said side portion reinforcing layer.

14. A pneumatic tire according to either claim 1 wherein said reinforcing element comprises a plurality of said helically formed filaments formed in a bundle assembled together without twisting at random.

* * * * *